(12) United States Patent
Lisseman et al.

(10) Patent No.: US 10,780,896 B2
(45) Date of Patent: Sep. 22, 2020

(54) SYSTEMS AND METHODS OF PROVIDING HAPTIC FEEDBACK

(71) Applicant: JOYSON SAFETY SYSTEMS ACQUISITION LLC, Auburn Hills, MI (US)

(72) Inventors: Jason Lisseman, Macomb, MI (US); Nicholas Borgerding, Auburn Hills, MI (US); Erick Staszak, Clarkston, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 267 days.

(21) Appl. No.: 15/862,469

(22) Filed: Jan. 4, 2018

(65) Prior Publication Data

US 2018/0194369 A1 Jul. 12, 2018

Related U.S. Application Data

(60) Provisional application No. 62/442,406, filed on Jan. 4, 2017.

(51) Int. Cl.
*B60W 50/16* (2020.01)
*G06F 3/01* (2006.01)
(Continued)

(52) U.S. Cl.
CPC ............ *B60W 50/16* (2013.01); *B62D 1/046* (2013.01); *B62D 15/02* (2013.01); *G06F 3/016* (2013.01);
(Continued)

(58) Field of Classification Search
CPC ...... B60W 50/16; B62D 15/029; G06F 3/017; G06F 3/16; G06F 3/016; G06F 3/0414; G06F 3/0488
(Continued)

(56) References Cited

U.S. PATENT DOCUMENTS 7,675,432 B2    3/2010  Leicht
7,714,701 B2 *  5/2010  Altan .................... B60Q 9/008
                                                         340/407.1
(Continued)

FOREIGN PATENT DOCUMENTS

CN          203267903           11/2013

OTHER PUBLICATIONS

International Search Report and Written Opinion issued for Application No. PCT/US2018/012394, dated May 31, 2018.

*Primary Examiner* — John A Tweel, Jr.
(74) *Attorney, Agent, or Firm* — Meunier Carlin & Curfman LLC

(57) ABSTRACT

A haptic communication system includes either a switch assembly or a compilation of discretely installed components. The switch assembly and the installed components utilize a haptic actuator to elicit tactile and/or audibly perceptible haptic outputs. The switch assembly and/or a collective haptic communication system includes a processor communicating with the actuator. Computerized instructions cause the processor to receive a message from an external system, identify either an audio or vibrational output signal, and communicate the output signal to the actuator. The audio or vibrational output signal causes the actuator to propagate a respective pressure wave that elicits an audible or inaudible, vibrational response at the output surface of the actuator. The pressure wave causes tactilely and/or audibly perceptible vibration within the individual switch assembly or within an overall installation such as a seat or steering assembly in a vehicle.

17 Claims, 27 Drawing Sheets

(51) Int. Cl.
*G06F 3/0488* (2013.01)
*G06F 3/041* (2006.01)
*B62D 15/02* (2006.01)
*G06F 3/16* (2006.01)
*B62D 1/04* (2006.01)

(52) U.S. Cl.
CPC ............ *G06F 3/017* (2013.01); *G06F 3/0414* (2013.01); *G06F 3/0488* (2013.01); *G06F 3/16* (2013.01); *G06F 3/165* (2013.01)

(58) Field of Classification Search
USPC ....................................................... 340/407.1
See application file for complete search history.

(56) References Cited

U.S. PATENT DOCUMENTS

| | | | |
|---|---|---|---|
| 7,852,225 B2 | 12/2010 | Lemasson et al. | |
| 7,902,987 B2 | 3/2011 | Lemasson et al. | |
| 9,188,223 B1 * | 11/2015 | Seagraves | F16H 63/42 |
| 9,278,705 B2 | 3/2016 | Murata et al. | |
| 9,358,925 B2 | 6/2016 | Kariatsumari | |
| 9,403,480 B2 | 8/2016 | Faeuster et al. | |
| 9,690,380 B2 | 6/2017 | Monkhouse et al. | |
| 2004/0025624 A1 | 2/2004 | Kreuzer | |
| 2004/0090321 A1 | 5/2004 | Keutz | |
| 2009/0096595 A1 | 4/2009 | Lemasson et al. | |
| 2012/0081234 A1 | 4/2012 | Shaffer et al. | |
| 2012/0126965 A1 | 5/2012 | Sanma et al. | |
| 2013/0021144 A1 | 1/2013 | Hamachi | |
| 2014/0002251 A1 | 1/2014 | Springer et al. | |
| 2015/0066245 A1 | 3/2015 | Lee et al. | |
| 2015/0097791 A1 | 4/2015 | Lisseman et al. | |
| 2015/0097793 A1 | 4/2015 | Lisseman et al. | |
| 2015/0097794 A1 | 4/2015 | Lisseman et al. | |
| 2015/0097795 A1 | 4/2015 | Lisseman et al. | |
| 2015/0197283 A1 | 7/2015 | Marti et al. | |
| 2015/0307022 A1 | 10/2015 | Nelson | |
| 2015/0314729 A1 | 11/2015 | Edgren | |
| 2016/0023667 A1 | 1/2016 | Sakurai et al. | |
| 2016/0023677 A1 | 1/2016 | Sakurai et al. | |
| 2016/0185354 A1 | 6/2016 | Lisseman et al. | |

* cited by examiner

SYSTEMS AND METHODS OF PROVIDING HAPTIC FEEDBACK

CROSS REFERENCE TO RELATED APPLICATION

This application claims priority to U.S. Application No. 62/442,406, entitled "Systems and Methods of Providing Haptic Feedback," filed Jan. 4, 2017, the content of which is herein incorporated by reference in its entirety.

BACKGROUND

Conventional haptic communication systems include eccentric rotating mass (ERM) devices that vibrate the structure to which the device is coupled. ERMs are bulky and expensive, which prevents their widespread use in steering assemblies and other components of vehicles. In addition, ERMs cannot output an audio signal.

Thus, there is a need in the art for a haptic communication system that provides sufficient feedback to the operator and that is easily implemented into vehicle components.

BRIEF SUMMARY

In a first embodiment, a haptic communication system includes a coneless voice coil coupled to a steering assembly, a processor in electrical communication with the coneless voice coil, a memory, and a vehicle communication system that is separate from the haptic communication system. The memory stores instructions for execution by the processor, and the instructions cause the processor to receive a message from the vehicle communication system. In response to receiving the message, the processor identifies an audio output signal associated with the message and communicates the audio output signal to the coneless voice coil. The audio output signal causes the coneless voice coil to propagate an audible pressure wave.

In another embodiment, a haptic communication system includes an actuator having an output surface, and the output surface is coupled to a seat or a steering assembly of a vehicle. The haptic communication system further includes a processor in electrical communication with the actuator, a memory, and a vehicle communication system that is separate from the haptic communication system. The memory stores instructions for execution by the processor, and the instructions cause the processor to receive a message from the vehicle communication system. The processor then identifies a vibrational output signal associated with the message and communicates the vibrational output signal to the actuator. The vibrational output signal causes the actuator to propagate an inaudible pressure wave from the output surface against a surface of the seat or steering assembly. The pressure wave causes tactilely-perceptible vibration of the seat or steering assembly, respectively.

In yet another embodiment, a switch assembly is configured to be coupled to a steering assembly, wherein the steering assembly has a resonant frequency. The switch includes a touch plate having a touch surface and an inner surface, and the inner surface is opposite and spaced apart from the touch surface. At least one force sensor is disposed adjacent the inner surface of the touch plate, wherein the at least one force sensor is configured for receiving a force applied to the touch surface. An actuator has an output surface from which pressure waves are propagated along an axis of propagation (A-A), and the output surface of the actuator is vibrationally coupled to the inner surface of the touch plate. A processor is electrically coupled to a memory, the at least one force sensor, the actuator, and a vehicle communication system, the vehicle communication system being separate from the switch assembly. The memory stores instructions for execution by the processor, wherein the instructions cause the processor to receive a force signal from the at least one force sensor and identify whether a touch event occurred based on the force signal. In response to identifying the touch event, the processor communicates a first output signal to the actuator, the first output signal causing the actuator to propagate a first inaudible pressure wave having a frequency ($f_f$) within a switch feedback frequency range, the switch feedback frequency range being below the resonant frequency ($f_R$) of the steering assembly. The first pressure wave causes a first tactilely-perceptible vibration of the touch plate along the axis of propagation (A-A), wherein the vibration caused by the first pressure wave of the first output signal is isolated to the switch assembly.

BRIEF DESCRIPTION OF THE DRAWINGS

These and other features, aspects, and advantages of the present invention will become apparent from the following description and the accompanying example implementations shown in the drawings, which are briefly described below.

DETAILED DESCRIPTION

Figure 1:
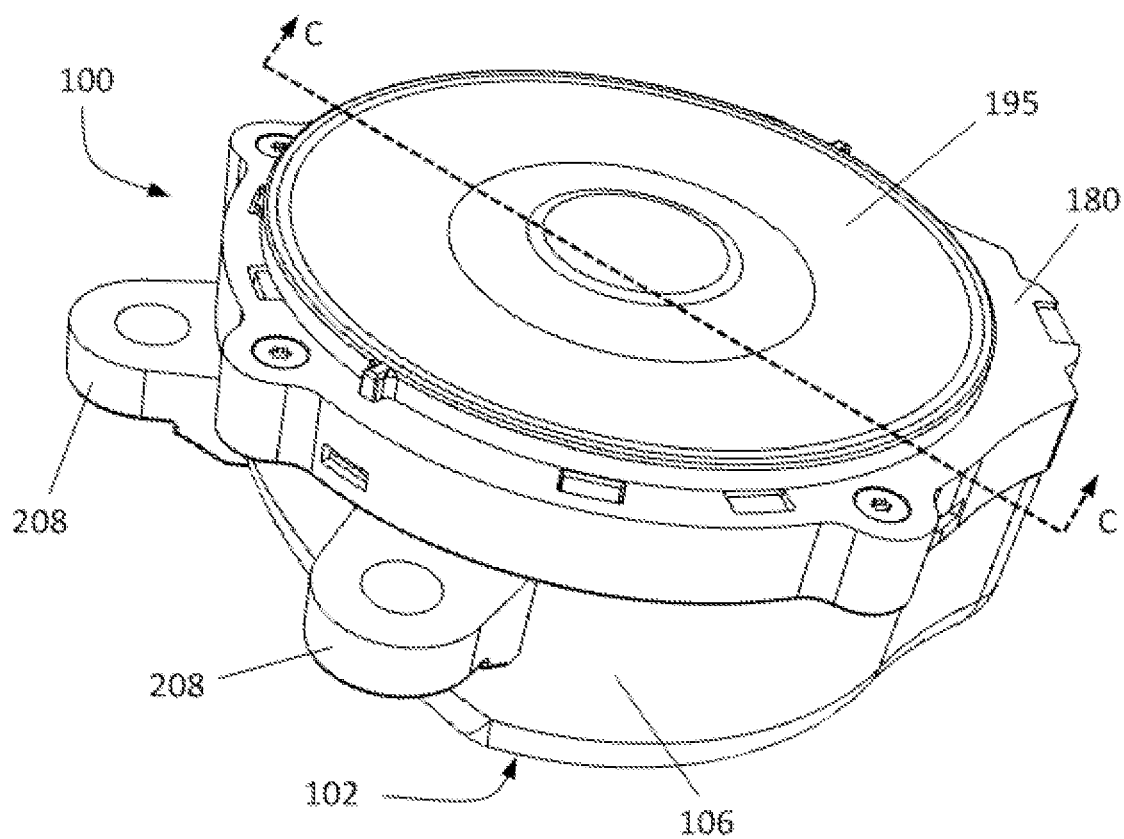
FIG. 1 illustrates a perspective view of a switch assembly according to one implementation.
Figure 2:
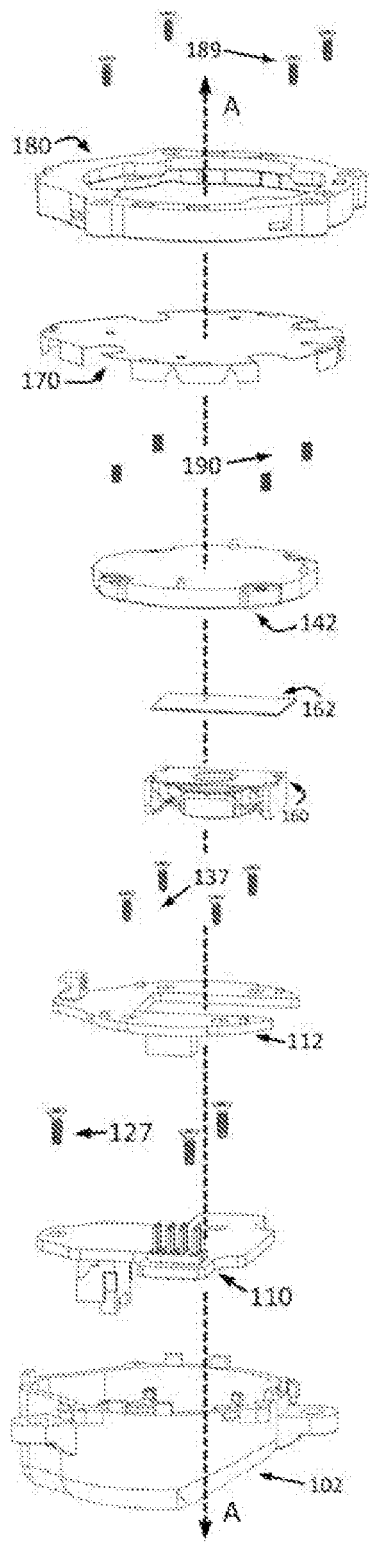
FIG. 2 illustrates an exploded view of part of the switch assembly shown in FIG. 1.

Various implementations include a switch assembly that includes a housing and at least two printed circuit boards (PCBs) that are disposed within the housing and are axially arranged relative to each other. One or more force sensors are disposed on one of the PCBs, and, in some implementations, the one or more force sensors receive force input received by a touch overlay plate. Signals from the force sensors are processed to determine a magnitude, acceleration, and/or location of the force input, and a haptic feedback response is received by the touch overlay plate. The haptic feedback response is based on the force magnitude, acceleration, and/or location of input, according to some implementations. Axially arranging the PCBs reduces the footprint of the switch assembly and allows for the inclusion of more electrical components in the switch assembly, according to some implementations.

Various implementations are described in detail below in accordance with the figures.

For example, FIGS. 1-12 illustrate a switch assembly according to one implementation. The switch assembly 100 includes a housing 102, a first printed circuit board (PCB) 110, a second PCB 112, a light guide 142, a membrane 170, an optional touch overlay plate 195, and an annular frame 180.

The housing 102 has a first wall 104 and a second wall 106 that define a chamber 108. The second wall 106 extends axially from a radial outer edge 105 of the first wall 104, forming a side wall. A distal edge 172 of the second wall 106 defines an opening to the chamber 108. Longitudinal axis A-A extends through a center of the chamber 108 and the first wall 104.

Two or more PCBs are arranged axially adjacent each other within the chamber 108. In particular, a first PCB 110 is disposed within the chamber 108 adjacent the first wall 104, and a second PCB 112 is axially adjacent and spaced apart from the first PCB 110 within the chamber 108. A first electrical connector 114 extends from a second surface 116 of the first PCB 110, and a second electrical connector 117 extends from a first surface 118 of the second PCB 112. These electrical connectors 114, 117 are axially aligned and coupled together to allow electrical communication between the PCBs 110, 112. The first PCB 110 also includes a third electrical connector 120 extending from a first surface 122 of the first PCB 110. The third electrical connector 120 is electrically coupled with a vehicle communication bus, for example. In the implementation shown, the third electrical connector 120 is axially arranged relative to the first electrical connector 114, but the connectors 120, 114 are not axially aligned. However, in other implementations, the third electrical connector 120 is axially aligned with the first electrical connector 114.

The first wall 104 of the housing includes a first set of one or more projections 125 that extend inwardly into the chamber 108 in the direction of axis A-A. The first surface 122 of the first PCB 110 is disposed on a distal surface 125a of the first set of one or more projections 125 such that the first surface 122 is spaced apart from the first wall 104. The first PCB 110 defines openings 124, and the first set of projections 125 define openings 126 that are axially aligned with openings 124. A fastener 127 is engaged through respective pairs of aligned openings 124, 126 to couple the first PCB 110 to the projections 125 and prevent relative movement of the first PCB 110 within the chamber 108. Although three fasteners are shown, more or less fasteners may be selected. In other implementations, other fastening arrangements may be selected. For example, other fastening arrangements include a friction fit within the housing, snaps, clips, rivets, adhesive, or other suitable fastening mechanism.

Figure 5:
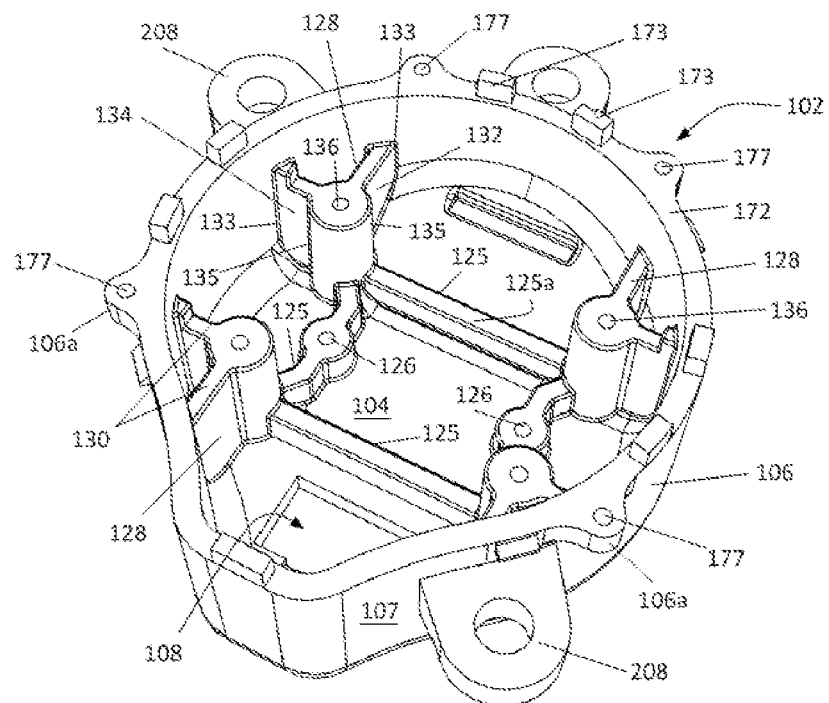
FIG. 5 illustrates a perspective view of the housing shown in FIG. 2.
Figure 6:
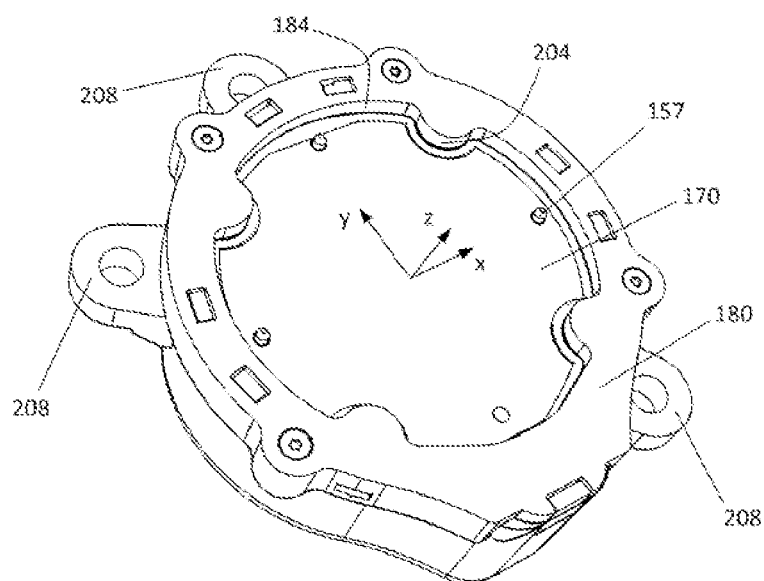
FIG. 6 illustrates a perspective view of the switch assembly shown in FIG. 2 partially assembled.
Figure 7:
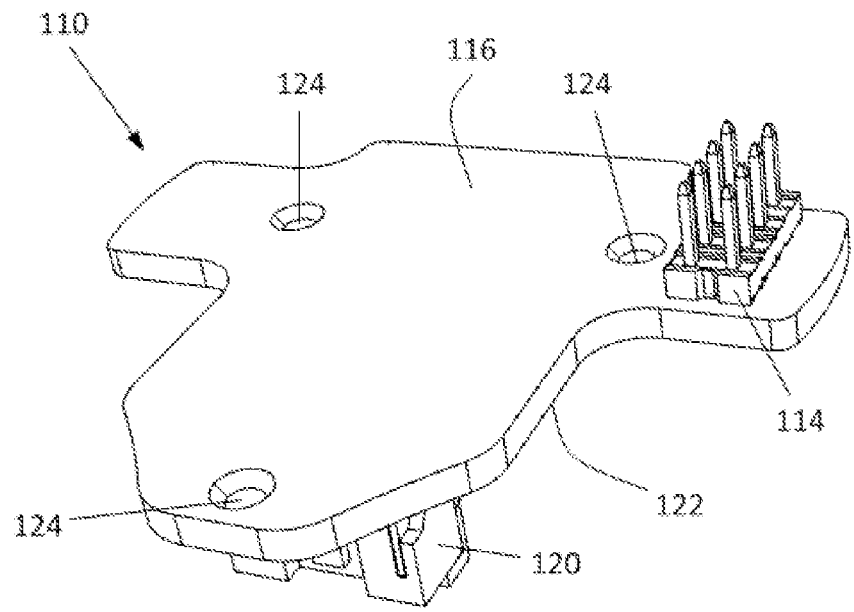
FIG. 7 illustrates a perspective view of the second surface of the first PCB shown in FIG. 2.
Figure 8:
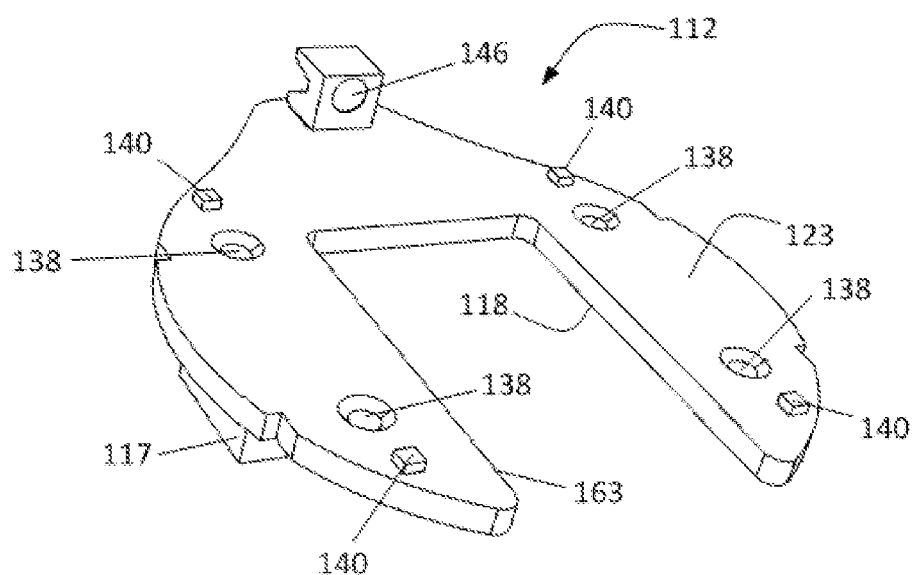
FIG. 8 illustrates a perspective view of the second surface of the second PCB shown in FIG. 2.

A second set of projections 128 extend axially inwardly into the chamber 108 from the first wall 104 and radially inwardly into the chamber 108 (e.g., in a direction perpendicular to and toward the axis A-A) from the second wall 106. The second set of projections 128 are spaced apart from each other. As shown in FIG. 5, each projection 128 includes a first rib 132 and a second rib 134. Each rib 132, 134 includes a proximal edge 133 that is coupled to the second wall 106 and a distal edge 135 that is spaced radially inwardly into the chamber 108 from the proximal edge 133.

The distal edges 135 of ribs 132, 134 intersect and define a boss 136. Projections 125 extend between projections 128, but the surface 125a of each projection 125 is spaced apart from a surface 130 of each projection 128. In particular, a plane that includes surface 125a is spaced axially between the first wall 104 and a plane that includes surface 130. The first surface 118 of the second PCB 112 is disposed on the surfaces 130 of projections 128 such that openings 138 defined in the second PCB 112 are axially aligned with openings defined by the bosses 136. Fasteners 137 extend through each pair of aligned openings 138, 136 to couple the second PCB 112 to the projections 128 and prevent relative movement of the second PCB 112 within the chamber 108. Although four fasteners are shown, more or less fasteners may be selected. In other implementations, other fastening arrangements may be selected. For example, other fastening arrangements include a friction fit within the housing, snaps, clips, rivets, adhesive, or other suitable fastening mechanism.

The first PCB 110 has an outer perimeter that is shaped to fit within the chamber 108 and between the second set of projections 128, which allows the first surface 122 of the first PCB 110 to be disposed on the surface 125a of projections 125. The second PCB 112 also has an outer perimeter that is shaped to fit within the chamber 108 such that the first surface 118 of the second PCB 112 engages the ribs 132, 134 of the second set of projections 128.

A plurality of force sensors 140 are disposed on the second surface 123 of the second PCB 112 and are spaced apart from each other. The force sensors 140 are axially aligned with respective first ribs 132 and/or second ribs 134. This arrangement allows force to be applied in the z-direction (i.e., along central longitudinal axis A-A) toward the force sensors 140, and the surfaces 130 of the projections 128 prevent the second PCB 112 from bending or flexing where the force sensors 140 are coupled to the second PCB 112 in response to the force applied, which prevents the force sensors 140 from being damaged. The surfaces 130 of the projections 128 also prevent axial movement of the second PCB 112 relative to the first PCB 110 and the housing 102 when force is received by the force sensors 140. In one implementation, the force sensors 140 comprise micro electro-mechanical sensors (MEMS) that provide an output signal that corresponds with an amount of force received by the sensors. For example, the MEMS force sensors are able to detect force with as little as 2 microns of displacement.

The light guide 142 is disposed within the chamber 108 and includes a first surface 144, a second surface 143 that is opposite and spaced apart from the first surface 144, and a side edge 145 that extends between the first surface 144 and the second surface 143. The first surface 144 of the light guide 142 faces the force sensors 140 coupled to the second PCB 112. The light guide 142 is a plate made from a transparent or translucent material. For example, the light guide 142 may comprise acrylic or a polycarbonate material. At least one light source is disposed on the second surface 123 of the second PCB 112. For example, in some implementations, the light source includes a light emitting diode (LED) 146, and the side edge 145 of the light guide 142 is disposed radially adjacent the LED 146. Light from the LED 146 travels through the side edge 145 of the light guide 142 and exits from the second surface 143 of the light guide 142. With this system, a single light source or multiple light sources are disposed on the same side, adjacent sides, or opposing sides of the light guide 142, and the light is directed toward the second surface 143 of the light guide 142. However, in other implementations, the light may enter the light guide 142 through the first surface 144 of the light guide 142.

In some implementations, the second surface 143, first surface 144, and/or side edge 145 of the light guide 142 include integrally formed micro-lenses to direct light through the light guide 142 and out of the second surface 143. For example, FIG. 9C illustrates a plurality of microlenses 147, which include protrusions and/or recessed portions, on the first surface 144 of the light guide 142. In other or further implementations, one or more light altering films are disposed on one or more of the light guide surfaces 143, 144 and/or side edge 145 of the light guide 142.

Figure 9A:
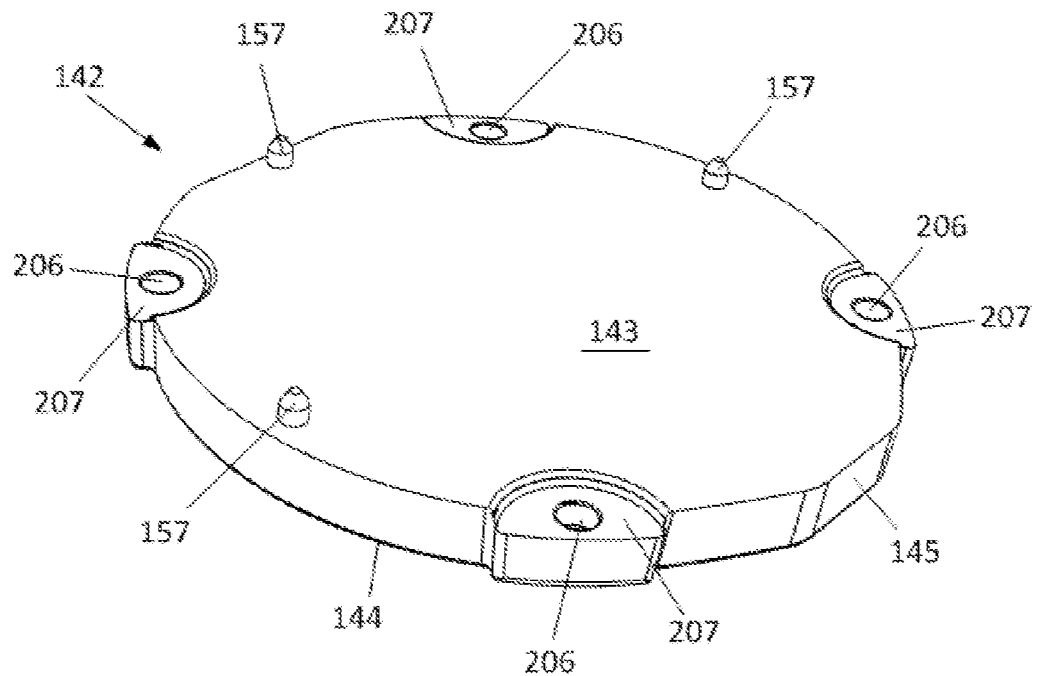
FIG. 9A illustrates a perspective view of the second surface of the light guide shown in FIG. 2.
Figure 9B:
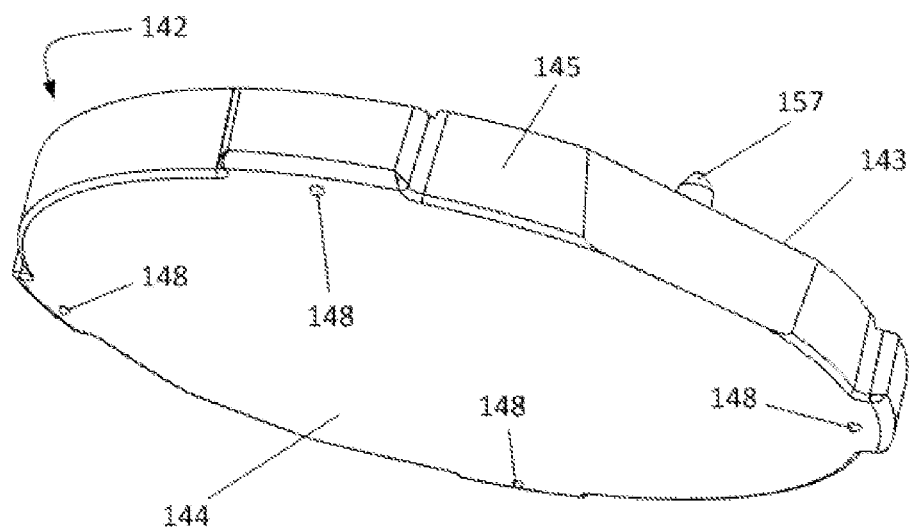
FIG. 9B illustrates a perspective view of the first surface of the light guide shown in FIG. 2.
Figure 9C:
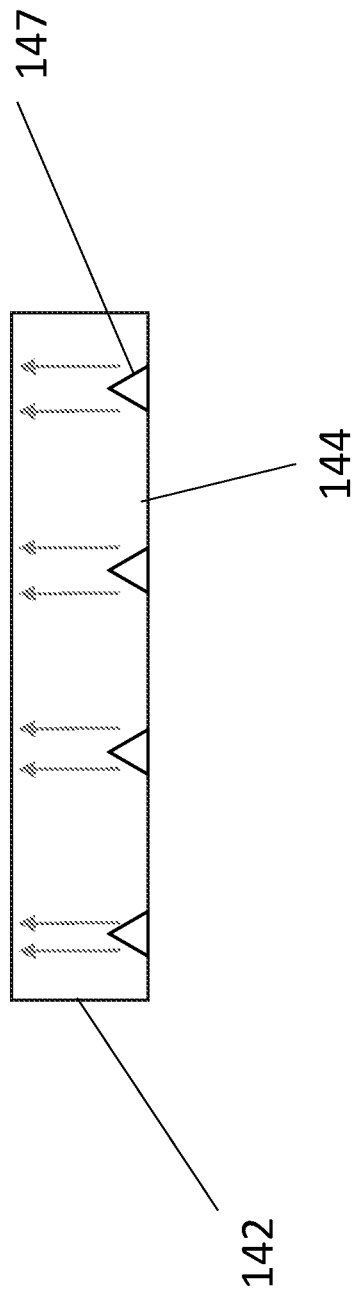
FIG. 9C illustrates a cross sectional view of the light guide shown in FIG. 2.
Figure 10A:
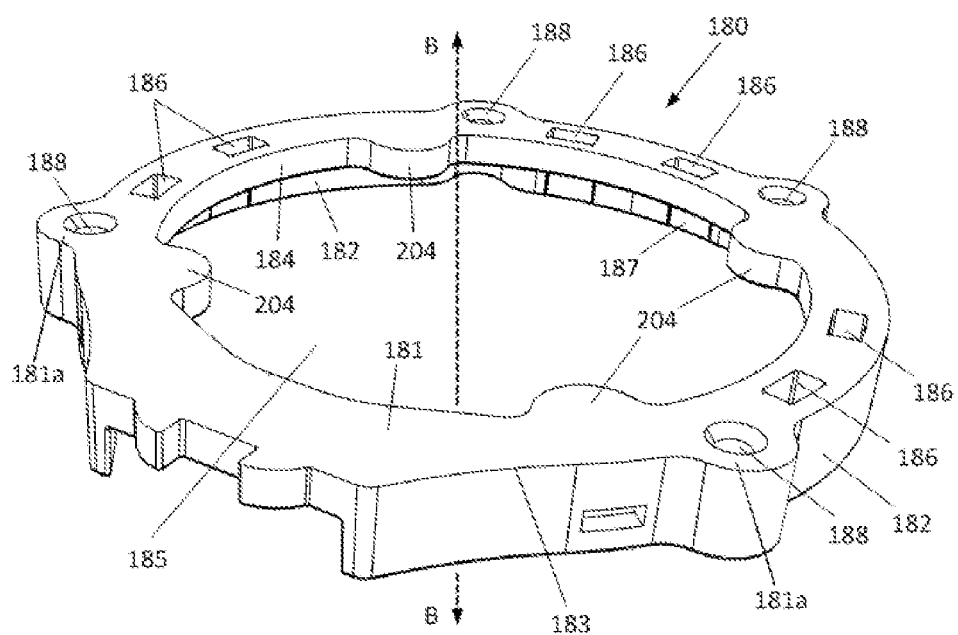
FIGS. 10A and 10B illustrate perspective views of the annular frame shown in FIG. 2.
Figure 10B:
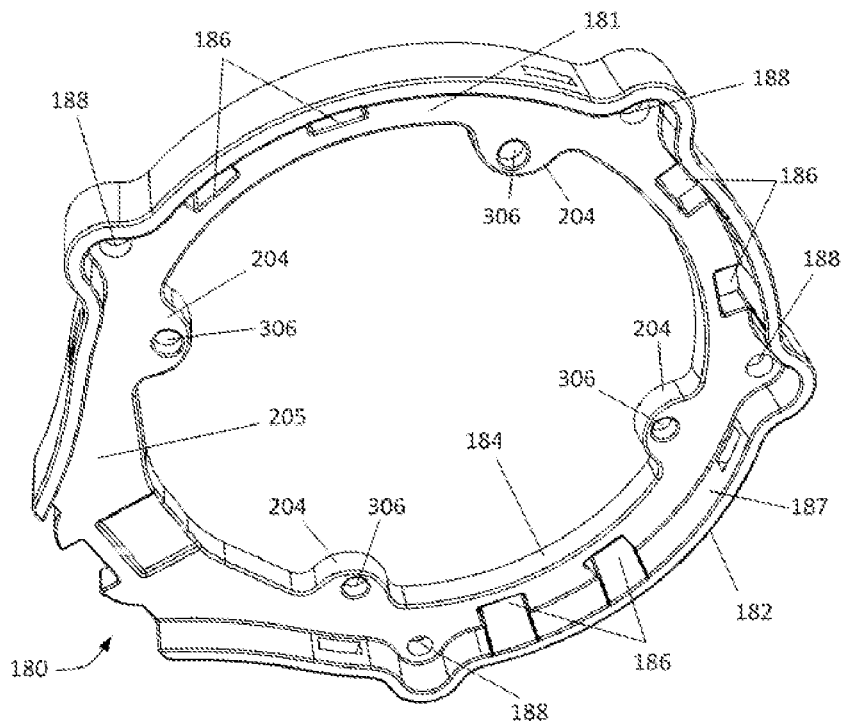
Figure 11:
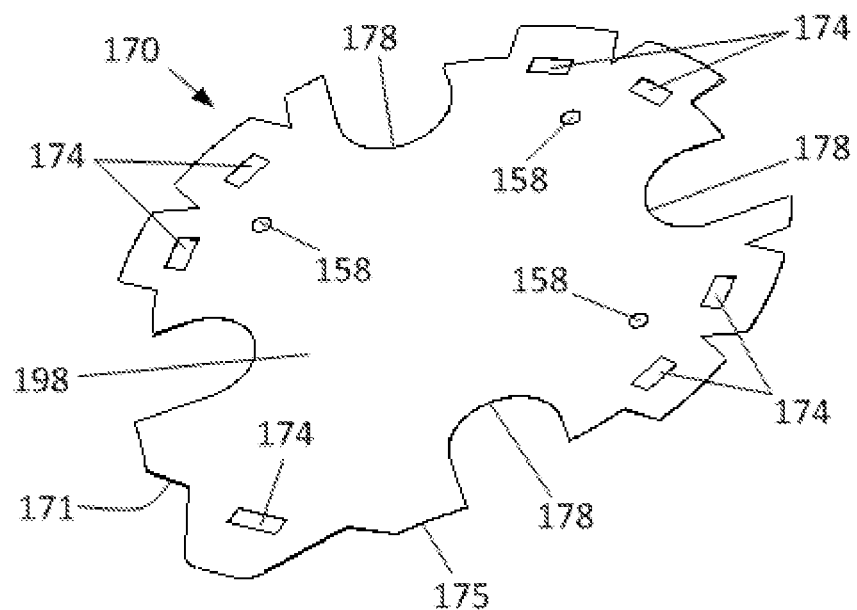
FIG. 11 illustrates a perspective view of the membrane shown in FIG. 2.

In the implementation shown in FIG. 9B, the first surface 144 of the light guide 142 includes a plurality of protrusions 148 that extend axially from the first surface 144. The protrusions 148 axially align with the force sensors 140 on the second PCB 112. The protrusions 148 concentrate the force received by the light guide 142 onto the force sensors 140. In one implementation, the protrusions 148 are integrally formed with the first surface 144. However, in other implementations, the protrusions 148 may be formed separately and coupled to the first surface 144.

Figure 13:
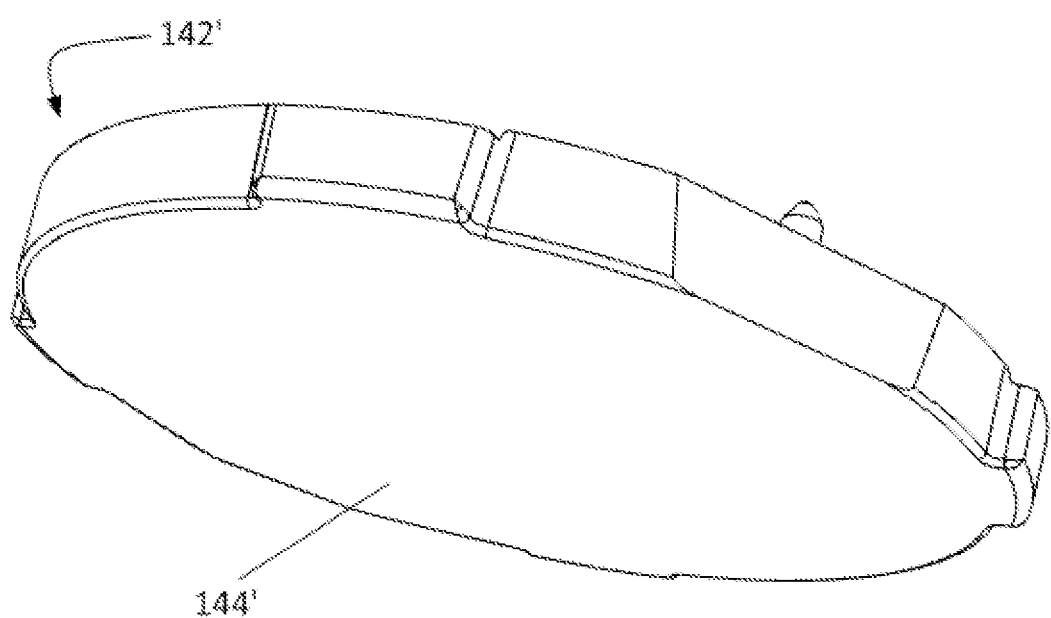
FIG. 13 illustrates perspective view of a first surface of a light guide according to another implementation.

In another implementation shown in FIG. 13, the first surface 144' of the light guide 142' is planar, and a force concentrator that is separately formed from the light guide 142' is disposed between each force sensor and the first surface 144' of the light guide 142'. Each force concentrator transfers force received by the light guide 142' to the respective force sensor below the force concentrator.

The haptic exciter 160 provides haptic feedback to a user. For example, according to one implementation, the haptic exciter 160 is a speaker (e.g., a coneless voice coil assembly), and the haptic output is an audible or inaudible sound (or pressure) wave that changes the air pressure near an output surface of the speaker by propagating a plurality of pressure waves along an axis of propagation. The propagation axis is perpendicular to an output surface 161, and in the implementation shown, is parallel to central axis A-A, which extends orthogonally to and through the surfaces 196, 197 of the touch plate 195. For example, the propagation axis may be co-axial with axis A-A in some implementations. In the implementation shown in FIGS. 1-12, the output surface 161 of the haptic exciter 160 is coupled directly to the first surface 144 of the light guide 142. Thus, at least a portion of the pressure waves propagated from the output surface 161 are directed toward and are captured by the first surface 144 of the light guide 142, which causes vibration, or oscillation, of the light guide 142 in the z-direction. In this implementation, the first surface 144 of the light guide 142 serves as the reaction surface for the exciter 160. The vibration of the light guide 142 is transferred to the membrane 160 and to the touch plate 195. Thus, the haptic exciter 160 is vibrationally coupled to the inner surface 196 of the touch plate 195 because pressure waves originating from the haptic exciter 160 induce a vibratory response on the touch plate 195. In some implementations, the haptic exciter 160 is coupled to the first surface 144 of the light guide 142 using an adhesive 162. However, in other implementations, other suitable fastening mechanisms may be used. And, in other implementations, the output surface 161 of the haptic exciter 160 is disposed axially adjacent and spaced apart from the first surface 144 of the light guide 142. In addition, in some implementations, the haptic exciter 160 is disposed adjacent a central portion of the first surface 144 of the light guide 142.

Figure 4:
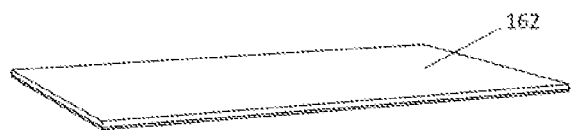
FIG. 4 illustrates a perspective view of the haptic exciter shown in FIG. 2.
Figure 4:
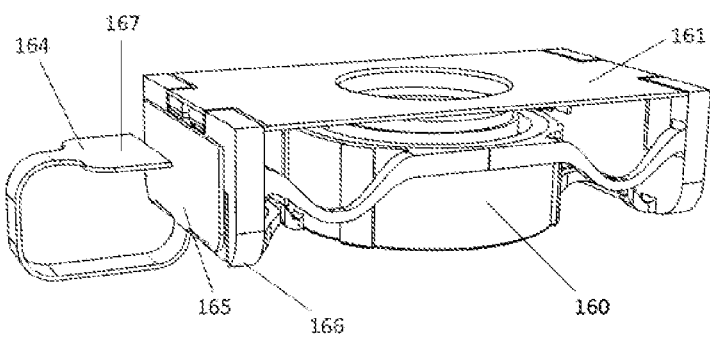

As shown in FIG. 4, the haptic exciter 160 includes a flexible cable connector 164 that has a first end 165 that is coupled to a first end 166 of the haptic exciter 160 and a second end 167 that is coupled to the first surface 118 of the second PCB 112. The flexible cable connector 164 minimizes or eliminates transmission of the vibration from haptic exciter 160 to the second PCB 112 while allowing the haptic exciter 160 to be electrically coupled to the second PCB 112. In one non-limiting example, the flexible cable connector may be a zero insertion force (ZIF)-type connector. In alternative implementations, the haptic exciter 160 is coupled to the second PCB 112 with wires that are coupled to each via soldering or other suitable coupling mechanism.

In addition, the second PCB 112 defines an opening 163 through which the output surface 161 of the haptic exciter 160 extends for coupling the output surface 161 to the first surface 144 of the light guide 142. This arrangement allows the height in the direction of axis A-A of the switch assembly 100 to be reduced, increases the energy received by the touch overlay 195 from the haptic exciter 160, and reduces the vibrational energy transferred to the second PCB 112. However, in other implementations, the second PCB 112 may not define opening 163, and the haptic exciter 160 may be axially spaced apart from the second surface 123 of the second PCB 112 and disposed between the first surface 144 of the light guide 142 and the second surface 123 of the second PCB 112. By spacing the haptic exciter 160 apart from the second PCB 112, the vibrational energy from the haptic exciter 160 is isolated from the second PCB 112, which allows more of the energy to be received by the light guide 142.

The flexible membrane 170 extends over the chamber 108. A first surface 171 of the flexible membrane 170 faces the second surface 143 of the light guide 142, and at least a portion of these surfaces 171, 143 are coupled together (e.g., by adhesion). A plurality of posts 173 extend axially from the distal edge 172 of the second wall 106 of the housing 102 and are circumferentially spaced apart from each other. The flexible membrane 170 defines a plurality of post openings 174 adjacent a radially outer edge 175 of the membrane 170. The posts 173 are engaged through respective post openings 174 of the membrane 170 to prevent movement of the membrane 170 in the x-y plane (i.e., plane perpendicular to the central axis A-A). In some implementations, the surfaces 171, 143 are coupled together prior to the posts 173 being engaged through the openings 174. By limiting the movement of the membrane 170 to the z-direction, the membrane 170 is able to transfer the vibration from the light guide 142 more efficiently, and the membrane 170 can prevent an x- or y-component of force incident on the switch assembly 100 from being transferred to the force sensors 140, which prevents damage to the force sensors 140 due to shear forces.

The membrane 170 is formed of a flexible material that is capable of resonating in the z-direction. For example, the membrane 170 may be made of a polymeric material (e.g., polyester, polycarbonate), a thin metal sheet, or other suitable flexible material. In addition, the stiffness of the material for the membrane 170 may be selected based on the amount of resonance desired and in consideration of the load to be incident on the membrane 170.

The touch overlay plate 195 has a first surface 196 and a second surface 197. At least a central portion 201 of the first surface 196 of the touch overlay plate 195 is coupled to a second surface 198 of membrane 170, and the second surface 197 of the touch overlay plate 195 faces in an opposite axial direction from the first surface 196 and receives force input from the user. For example, in one implementation, the second surface 198 of the membrane 170 and the central portion 201 of the first surface 196 of the touch overlay plate 195 are adhered together.

Figure 3:
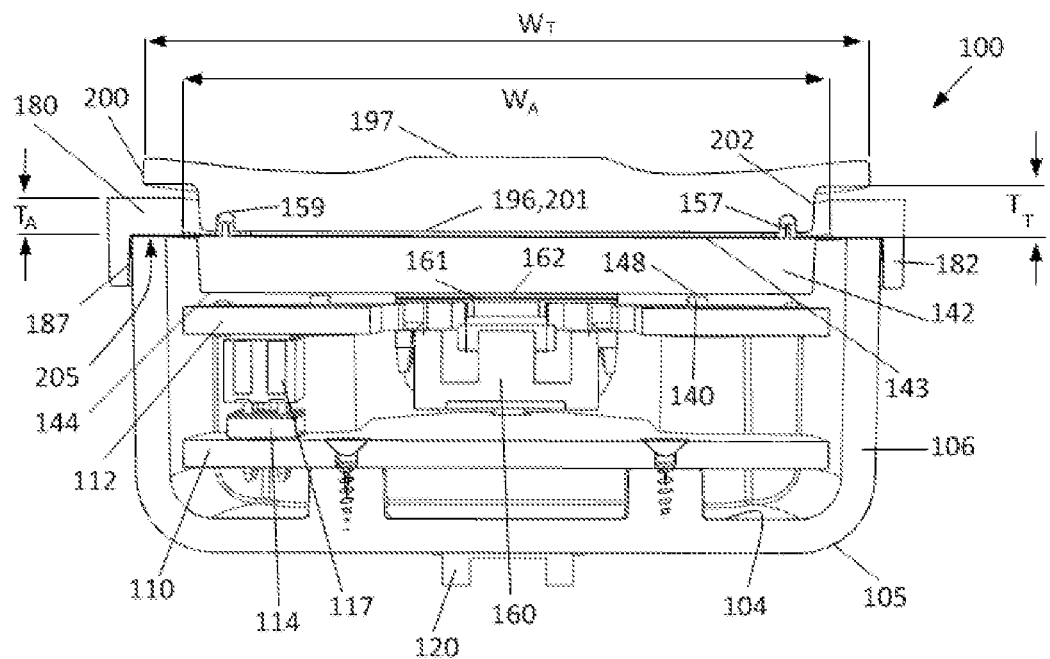
FIG. 3 illustrates a cross sectional view of a partially assembled switch assembly as taken through the C-C line in FIG. 1.

In some implementations, at least a portion of the second surface 197 of the touch overlay plate 195 is textured differently than the portion of the vehicle adjacent to the switch assembly 100 to allow the user to identify where the touch overlay plate 195 is in the vehicle without having to look for it. And, in some implementations, as shown in FIG. 3, the second surface 197 includes a non-planar surface. For example, the contour of the non-planar surface may be customized based on various applications of the assembly and/or to facilitate the user locating the second surface 197 without having to look for it.

In some implementations, icons are disposed on the touch overlay plate 195, and light exiting the second surface 143 of the light guide 142 passes through the membrane 170 and the icons on the touch overlay plate 195 to illuminate the icons. For example, by providing icons on a sheet that is adhesively coupled to the touch overlay plate 195, the icons are easily customizable for each vehicle manufacturer, and the switch assembly 100 is manufactured efficiently.

In some implementations, the flexible membrane 170 oscillates in the z-direction in response to receiving vibrational energy from the haptic exciter 160 via the light guide 142, and this oscillation is transferred to the touch overlay plate 195 to provide the haptic feedback to the user. Furthermore, the haptic response of the switch assembly 100 is tunable by selecting a light guide 142, membrane 170, and touch overlay plate 195 that together have a certain stiffness.

In addition, to isolate the vibration of the light guide 142 and touch overlay plate 195 from the housing 102 and PCBs 110, 112 and to ensure that the light guide 142 and touch overlay plate 195 do not rotate about the central axis A-A, an interlocking mechanism is employed to couple the light guide 142 and the touch overlay plate 195, according to some implementations. For example, as shown in FIGS. 3, 6, 9A, 11, and 12, the second surface 143 of the light guide 142 defines a second set of protrusions 157 that extend axially away from the second surface 143. The second set of protrusions 157 includes two or more protrusions, and the protrusions 157 are spaced apart from each other. The protrusions 157 are disposed radially inward of and adjacent the side edge 145 of the light guide 142. The flexible membrane 170 defines openings 158 through which the protrusions 157 extend. And, the first surface 196 of the touch overlay plate 195 defines recessed portions 159 that extend axially into the first surface 196. Distal ends of the protrusions 157 extend and are seated within the recessed portion 159. In the implementation shown in FIGS. 9A and 12, there are four recessed portions 159 defined in the touch overlay plate 195 and three protrusions 157 extending from the second surface 143 of the light guide 142. Having one or more additional recessed portions 159 allows parts to be standardized such that they can be used in different areas of the vehicle (e.g., left side or right side). However, in other implementations, the interlocking mechanism may include one or more protrusions and recessed portions.

In some implementations, a portion or all of the touch overlay plate 195 is comprised of a transparent or translucent material and allows light to pass through the touch overlay plate 195. For example, the touch overlay plate 195 may comprise a piece of clear, contoured glass. Other transparent or translucent materials can be used, including other crystal materials or plastics like polycarbonate, for example. The contoured nature of one side, the second side 197, of the touch overlay plate 195 allows the user to move around their finger to find the right button location without having to initiate the switch past the force threshold.

The annular frame 180 includes an annular wall 181 and a side wall 182 that extends axially from adjacent an outer radial edge 183 of the annular wall 181. The annular wall 181 includes an inner radial edge 184 that defines an opening 185 having a central axis B-B. The annular wall 181 also defines one or more post openings 186 between the inner radial edge 184 and the outer radial edge 183. The annular frame 180 is coupled to the second wall 106 of the housing 102. When coupled together, an inner surface 187 of the side wall 182 is disposed adjacent an outer surface 107 of the second wall 106. A portion of the membrane 170 adjacent the outer radial edge 175 of the membrane 170 is disposed between the annular wall 181 and the distal edge 172 of the second wall 106. Posts 173 are engaged through openings 174 defined in the membrane 170 and within respective post openings 186 of annular wall 181 to prevent movement in the x-y plane of the annular frame 180 relative to the housing 102. When coupled, the axis B-B of the annular frame 180 is coaxial with axis A-A of the housing 102. In the implementation shown, at least a portion of the outer radial edge 175 of the membrane 170 folds over the distal edge 172 of the second wall 106 and is disposed between the inner surface 187 of side wall 182 of the annular frame 180 and the outer surface 107 of the second wall 106. Furthermore, protrusions 157 are disposed radially inward of the inner radial edge 184 of the annular wall 181 when the annular frame 180 is coupled to the housing 102.

Fastener openings 188 are defined in the annular wall 181, and fastener openings 177 are defined by the second wall 106 of the housing 102. Fasteners 189 are engaged through aligned pairs of openings 188, 177 to couple the annular frame 180 to the housing 102. For example, in the implementation shown in FIGS. 1-12, the annular wall 181 includes radial extensions 181a that extend radially outwardly from the wall 181 and define the fastener openings 188. And, radial extensions 106a extend radially outwardly from the wall 106 and define fastener openings 177. However, in other implementations, the annular frame 180 is coupled to the housing 102 using other fastening arrangements. For example, in some implementations, the annular frame 180 is coupled to the housing 102 via fasteners extending through the side wall 182 of the annular frame 180 and the outer surface 107 of the second wall 106 of the housing 102. In other implementations, the annular frame 180 is coupled to the housing 102 using a friction fit, snaps, clips, rivets, adhesive, or other suitable fastening mechanism.

In certain implementations, one or more springs are disposed between the annular wall 181 of the annular frame 180 and the light guide 142 to urge the light guide 142 toward the second surface 123 of the second PCB 112. By disposing one or more springs between the annular wall 181, which is fixedly coupled to the housing 102, and the light guide 142, the one or more springs pre-load the force sensors 140. For example, the one or more springs may pre-load the force sensors to between 1 and 5 N. In one non-limiting example, the one or more springs pre-load the force sensors to 2.8 N. For example, in the implementation shown in FIGS. 1-12, the springs include coil springs 190 that extend between a first surface 205 of the annular wall 181 and the second surface 143 of the light guide 142. Axial depressions 206 are defined in a recessed portion 207 defined by the second surface 143 of the light guide 142 and the side edge 145 of the light guide 142. The recessed portions 207 have a surface that is axially spaced apart from the second surface 143 of the light guide 142 in a direction toward the first surface 144 of the light guide 142. Inward radial extensions 204 extend radially inwardly from the inner radial edge 184 of the annular wall 181. The inward radial extensions 204 also define axial depressions 306 according to some implementations. The axial depressions 306 defined by the inward radial extensions 204 are axially aligned with the axial depressions 206 defined by the light guide 142, and ends of each spring 190 seats in the respective axially aligned axial depression 306 of the inward radial extension 204 and the axial depression 206 of the light guide 142 to prevent movement of the coil spring 190 in the x-y plane. In addition, the membrane 170 defines spring recesses 178 that extend radially inwardly from the outer radial edge 175 of the membrane 170, and the springs 190 extend through the recesses 178 and are spaced apart from the outer radial edge 175 of the membrane 170 so as not to interfere with the oscillation of the membrane 170.

Figure 19A:
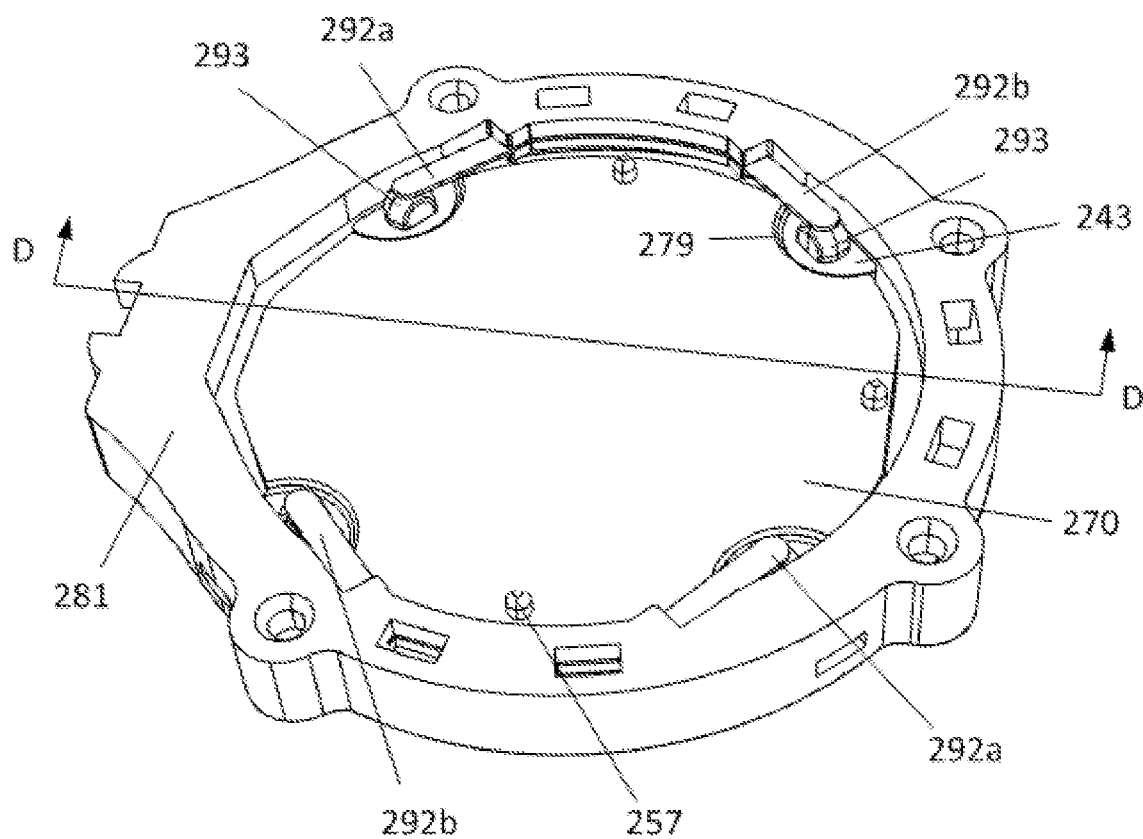
FIG. 19A illustrates a perspective view of a portion of a switch assembly according to another implementation.
Figure 19B:
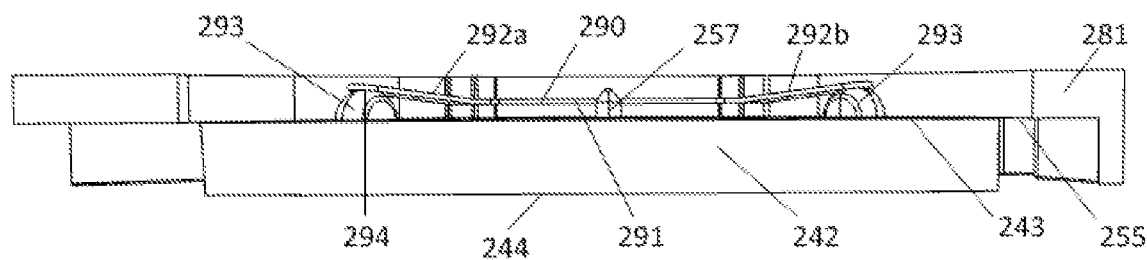
FIG. 19B illustrates a cross sectional view of the portion of the switch assembly shown in FIG. 19A as taken through the D-D line.
Figure 19C:
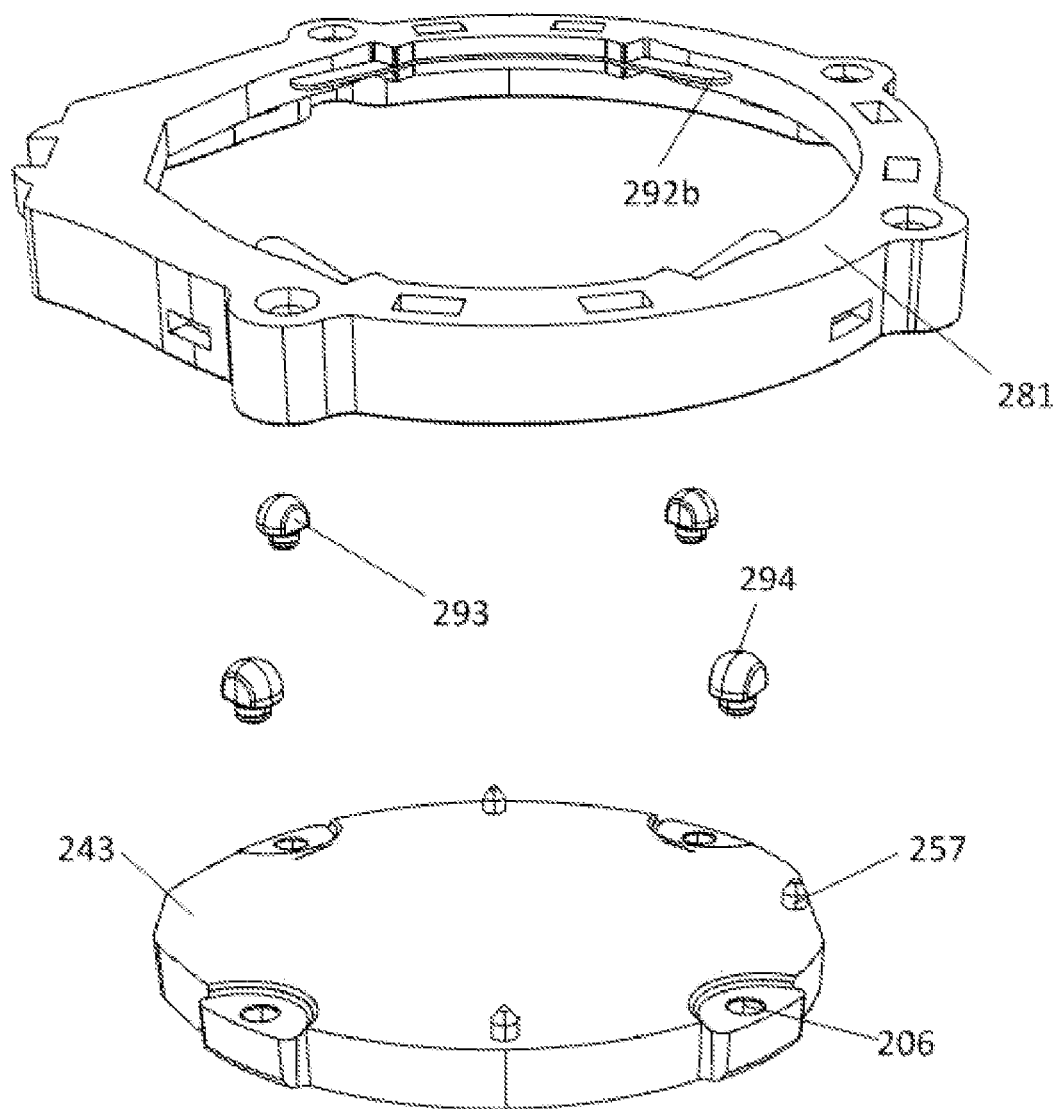
FIG. 19C illustrates an exploded view of the portion of the switch assembly shown in FIG. 19A.
Figure 20A:
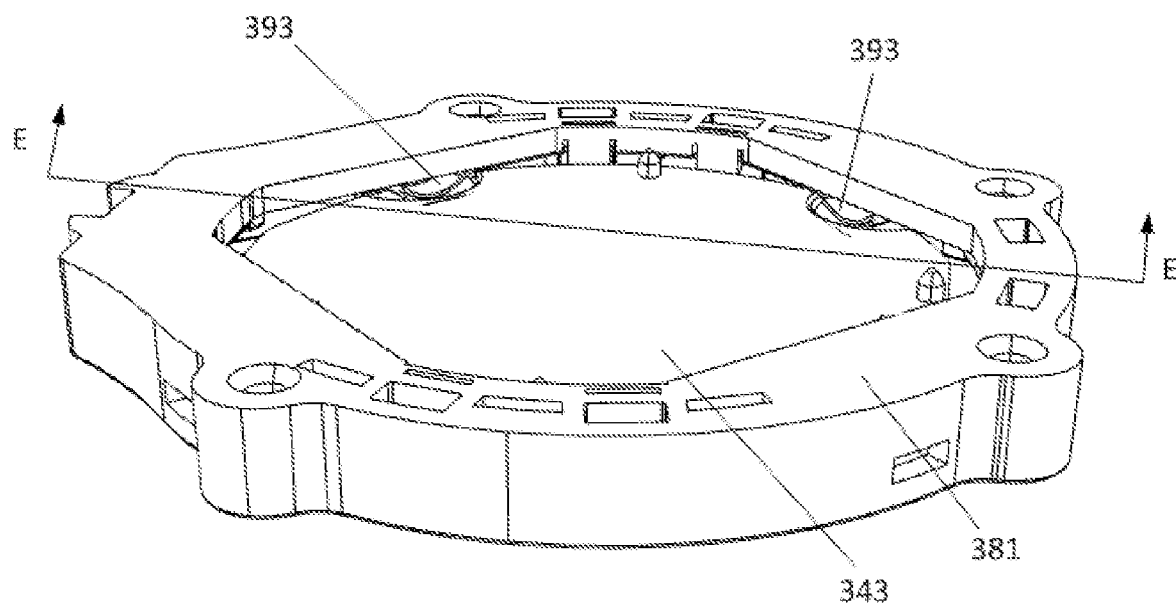
FIG. 20A illustrates a perspective view of a portion of a switch assembly according to another implementation.
Figure 20B:
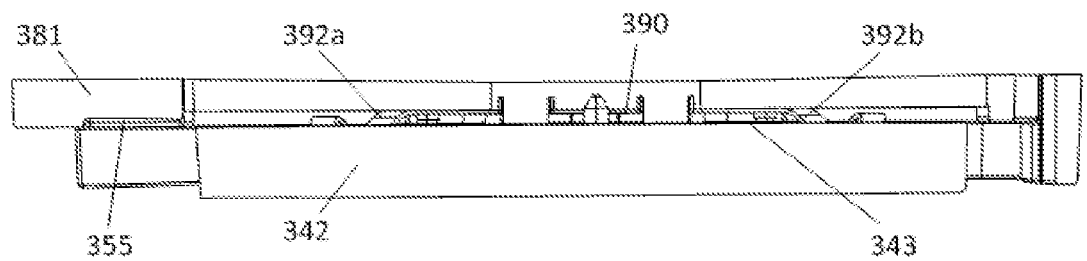
FIG. 20B illustrates a cross sectional view of the portion of the switch assembly shown in FIG. 20A as taken through the E-E line.
Figure 20C:
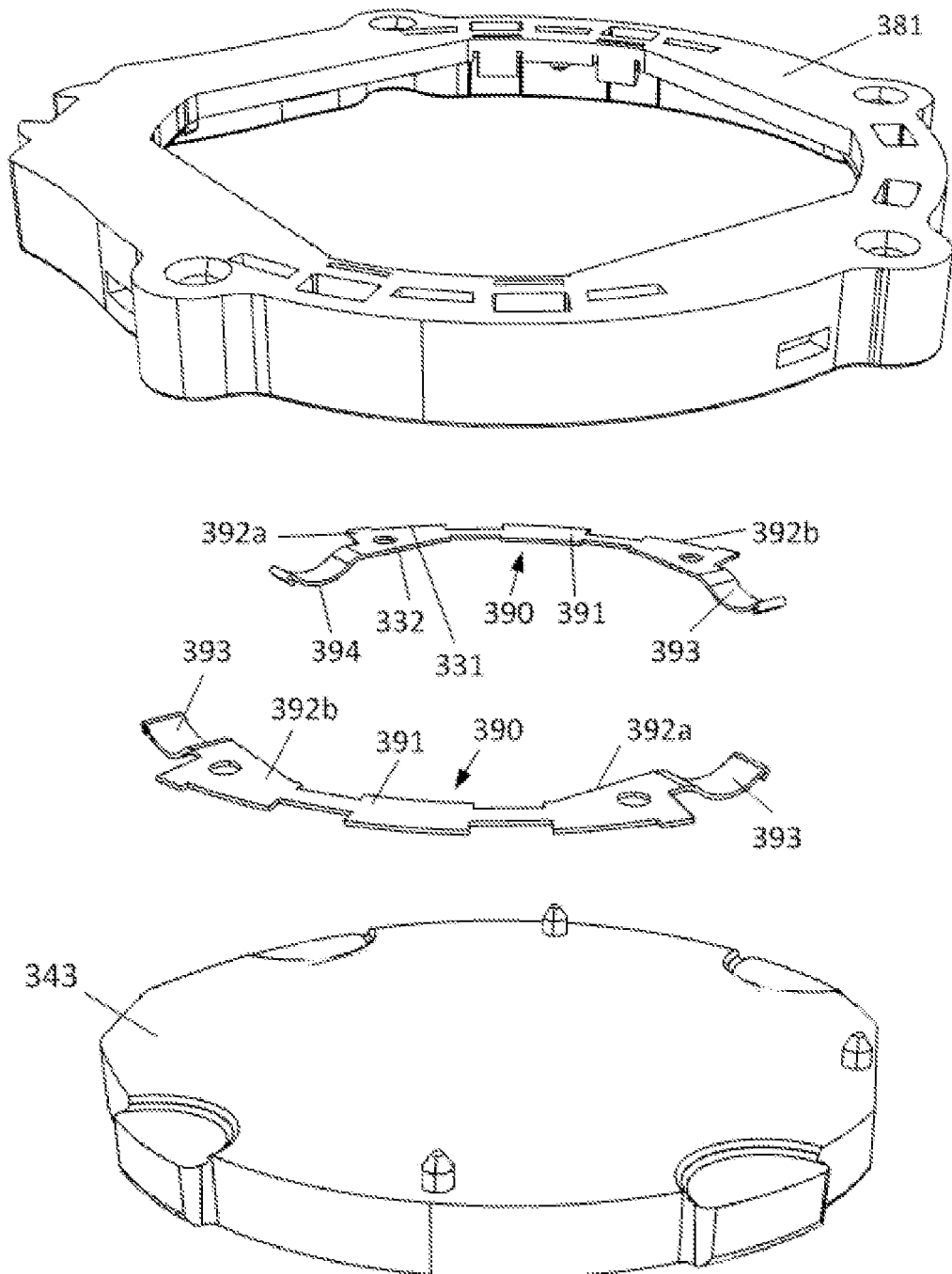
FIG. 20C illustrates an exploded view of the portion of the switch assembly shown in FIG. 20A.
Figure 20D:
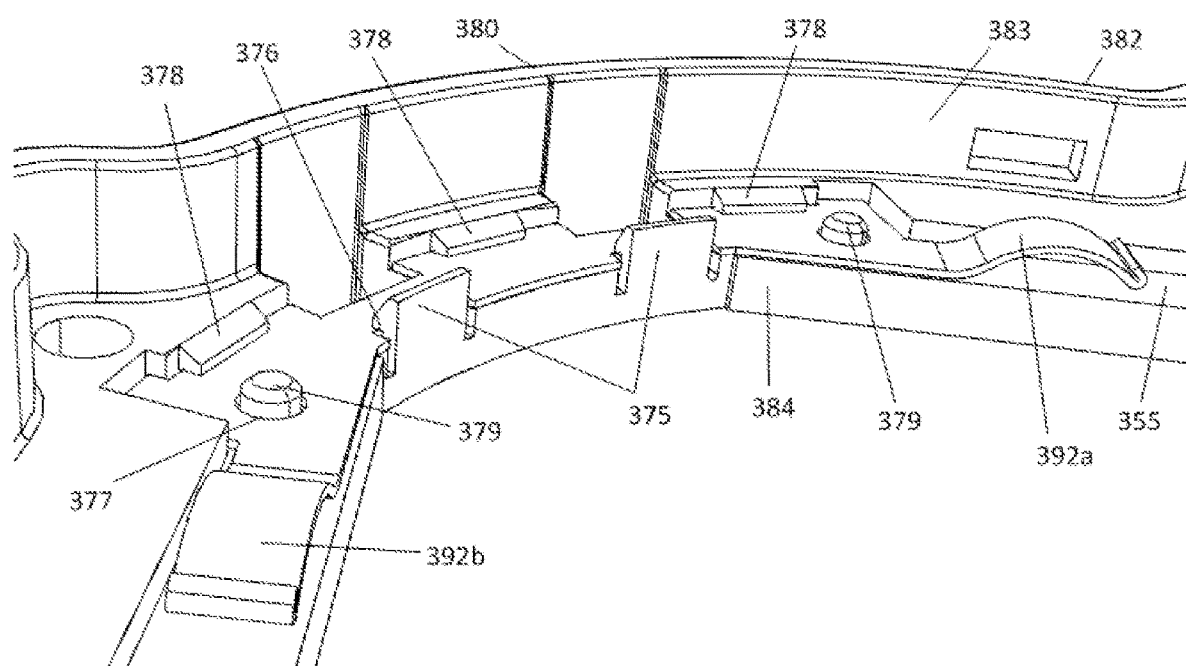
FIG. 20D illustrates a perspective view of a portion of the switch assembly shown in FIG. 20A.

In the implementation shown in FIGS. 19A-19C, the springs are leaf springs 290. The leaf springs 290 include a central portion 291 and leg portions 292a, 292b. Leg portions 292a, 292b extend circumferentially from and radially inwardly from the central portion 291. The second surface 243 of the light guide 242 includes a plurality of posts 293 that extend axially away from the second surface 243, and the membrane 270 defines openings 279 through which the posts 293 extend. The central portion 291 of each leaf spring 290 is coupled to the first surface 255 of the annular wall 281 of the annular frame 280, and the leg portions 292a, 292b engage distal ends 294 of posts 293. When assembled, a plane that includes the first surface 255 of the annular wall 281 to which the central portion 291 of the leaf spring 290 is coupled is axially between a plane that includes the distal ends 294 of the posts 293 and a plane that includes the second surface 243 of the light guide 242. Thus, the leg portions 292a, 292b of the leaf spring 290 are biased toward the light guide 242 and urge the first surface 244 of the light guide 242 toward the second PCB 112. It is to be appreciated that the posts 293 may be separate from the light guide 242, or they can be integrally formed with the light guide 242.

FIG. 19B also shows a second set of protrusions 257, which are similar to the second set of protrusions 157 shown in FIGS. 3, 6, 9A, 11, and 12, that extend axially away from the second surface 243 of the light guide 242. The second set of protrusions 257 includes three protrusions, and the protrusions 257 are spaced apart from each other. The protrusions 257 are disposed radially inward of and adjacent the side edge 245 of the light guide 242. Like the protrusions 157 described above, the protrusions 257 extend through openings in the membrane and into recessed portions defined by the first surface of the touch overlay.

FIGS. 20A-20D illustrate leaf spring 390 according to another implementation. In this implementation, the leaf spring 390 includes a central portion 391 and leg portions 392a, 392b that extend circumferentially from and radially inwardly from the central portion 391. Each leg portion 392a, 392b also includes an arcuate portion 393 having an apex 394 that is within a plane that is spaced apart from a plane that includes the central portion 391. The central portion 391 is coupled to the first surface 355 of an annular wall 381, and the apex 394 of each arcuate portion 393 abuts the second surface 343 of the light guide 342. The arcuate portion 393 maintains a minimum axial spacing between the second surface 343 of the light guide 342 and the first surface 355 of the annular wall 381.

At least a portion of the leaf spring 390 is coupled to the annular frame 380. The inner radial edge 384 of the annular wall 381 includes one or more resilient tabs 375 that extend axially in a first direction (i.e., in a direction away from and orthogonal to the first surface 355 of the annular wall 381) from the inner radial edge 384. Each resilient tabs 375 has a shoulder 376 that extends radially outwardly from the tab 375 toward the first surface 355 of the annular wall 381. Each shoulder 376 is axially spaced apart from the first surface 355 of the annular wall 381. The side wall 382 of the annular frame 380 also includes one or more tabs 378 that extend radially inwardly from an inner surface 383 of the side wall 382. The one or more tabs 378 are axially spaced apart from the first surface 355 of the annular wall 381. The first surface 355 of the annular wall 381 includes one or more protrusions 379 that extend axially in the first direction from the first surface 355. A radially outer edge 331 of the central portion 391 of the leaf spring 390 is urged axially between tabs 378 and the first surface 355 of the annular wall 381, and a radially inner edge 332 of the central portion 391 is urged against the resilient tabs 375, which causes the resilient tabs 375 to bend radially inwardly as the leaf spring 390 passes by the shoulders 376 and is disposed between the shoulders 376 and the first surface 355 of the annular wall 381. Also, a concave surface of each arcuate portion 393 is positioned to face axially toward the first surface 355 of the annular wall 381 such that the apex 394 faces away from the first surface 355. The leaf spring 390 defines one or more openings 377 that align with the one or more protrusions 376, and the protrusions 376 extend through the openings 377 when the edges 331, 332 are disposed between the tabs 375, 378 and the first surface 355 of the annular wall 381. The tabs 375, 378 hold the leaf spring 390 axially and radially adjacent the annular frame 380, and the protrusions 376 engaged through the openings 377 prevent the leaf spring 390 from circumferential movement relative to the annular frame 380.

In other implementations, the leaf spring 290, 390 is over-molded with a portion of the annular frame 280, 380 over the central portion 291, 391 thereof. And, in some implementations, the spring 290, 390 may be adhered to, snapped to, or otherwise fastened to the annular frame 280, 390.

In addition, according to various implementations, the leaf spring 290, 390 may comprise a spring steel plate.

Figure 12:
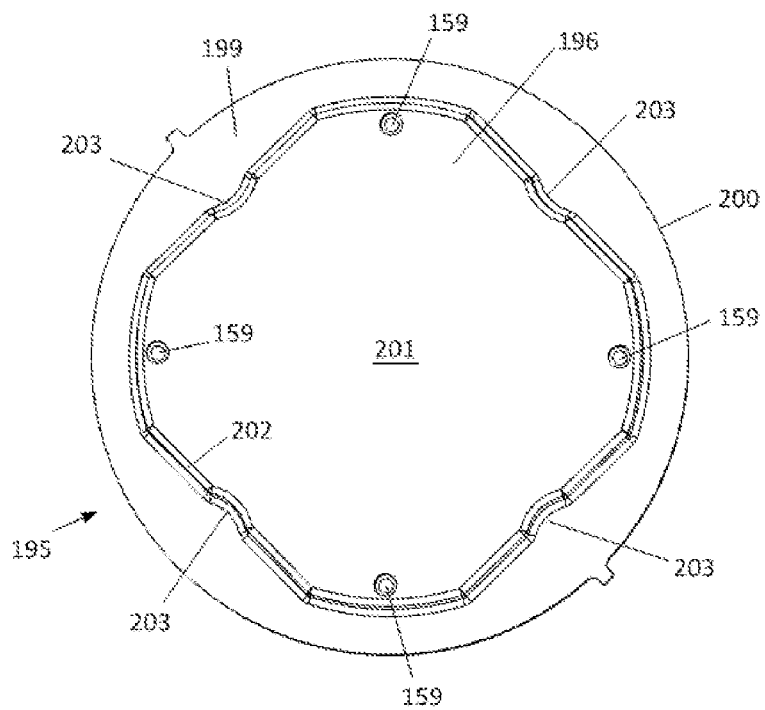
FIG. 12 illustrates a plan view of the first surface of the touch overlay plate shown in FIG. 1.

The central portion 201 of the touch overlay plate 195 is disposed within the opening 185 defined by the inner radial edge 184 of the annular wall 181 and is coupled to the membrane 170, as described above. As shown in FIG. 12, the first surface 196 of the touch overlay plate 195 defines a recessed portion 199 adjacent an outer radial edge 200 of the touch overlay plate 195. The recessed portion 199 and an outer radial edge 202 of the central portion 201 of the first surface 196 further define a plurality of depressions 203 (or grooves) that extend axially from the first surface 196 of the central portion 201 to the annular recessed portion 199 and radially inwardly from the outer radial edge 202. To prevent the touch overlay plate 195 from contacting the annular frame 180, the depressions 203 are spaced radially inwardly of the radial extensions 204 of the annular wall 181 of the annular frame 180. In addition, the distance $T_T$ between the surface of the annular recessed portion 199 and the surface of the central portion 201 is greater than a thickness $T_A$ (as measured in the z- or axial direction) of the annular wall 181. And, a diameter (or width $W_T$) of the second surface 197 of the touch overlay plate 195 is greater than a diameter (or width $W_A$) of the annular wall 181 such that the touch overlay plate 195 hides the annular wall 181 when the assembly 100 is viewed from the second surface 197 of the touch overlay plate 195.

In some implementations, such as those described above, the distal edge 172 of the second wall 106 of the housing 102, the annular frame 180, the light guide 142, and the outer radial edge 200 of the touch overlay plate 195 are generally circular. However, in other implementations, these portions of the switch assembly may have a non-circular shape, such as triangular, rectangular, or other suitable polygonal shape. In other implementations, the switch assembly includes just one PCB on which the force sensors are disposed. In such implementations, the circuitry required to operate the switch fits on the one PCB.

In addition, in other implementations, the switch assembly may include just one PCB and one force sensor for applications that require output from one force sensor (output that is not position specific).

In some implementations, the switch assemblies described above are mountable within a vehicle. For example, the switch assemblies are mountable to a steering wheel, such as to the bevel or hub of the steering wheel, for use in controlling various vehicle systems. In other examples, the switch assemblies are mountable to a vehicle door, gear shifter, dashboard, or any portion of the vehicle where input can be provided and used to control one or more vehicle systems.

For example, in some implementations, such as those described above, the housing is coupled to a trim piece in the vehicle instead of a frame or support portion of the vehicle, which isolates the vibration from the haptic exciter from other portions of the vehicle. This arrangement also allows the gap between edges of the trim piece and the outer edge of the assembly to be minimized because the trim piece can move with the assembly. To couple the housing to the trim piece (or other portion of the vehicle), bosses 208 that extend radially outwardly from the outer surface of second wall are aligned with openings defined adjacent the portion of the vehicle to which the switch assembly is being coupled. A fastener is engaged through the aligned openings to secure the assembly to the vehicle.

Figure 14:
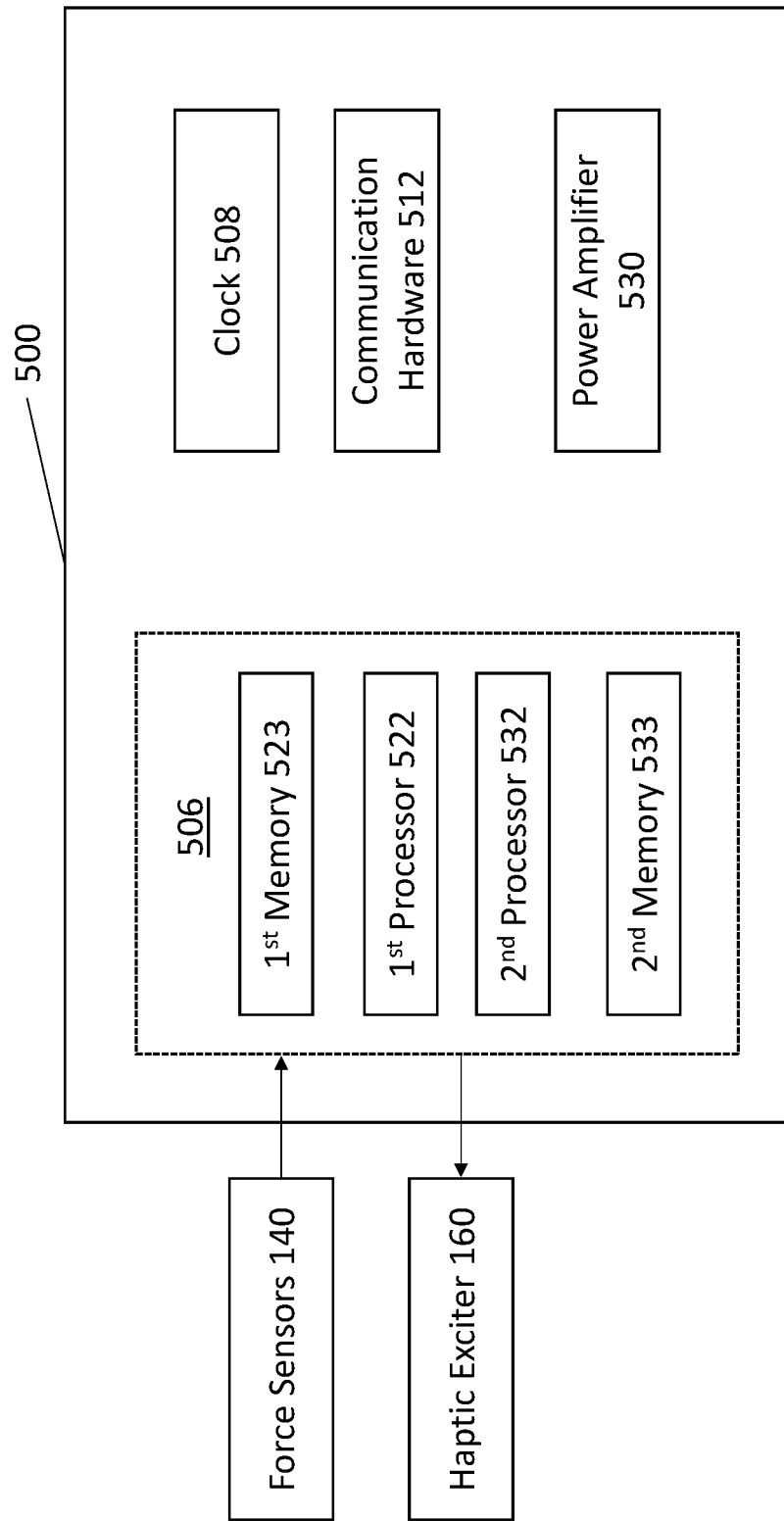
FIG. 14 illustrates a block diagram of an electrical control system according to one implementation.

FIG. 14 illustrates a block diagram of the electrical control system 500, according to one implementation. The electrical control system 500 may include a computing unit 506, a system clock 508, and communication hardware 512. In its most basic form, the computing unit 506 includes a processor 522 and a system memory 523 disposed on the second PCB 112. The processor 522 may be standard programmable processors that perform arithmetic and logic operations necessary for operation of the electrical control system 500. The processor 522 may be configured to execute program code encoded in tangible, computer-readable media. For example, the processor 522 may execute program code stored in the system memory 523, which may be volatile or non-volatile memory. The memory 523, which can be embodied within non-transitory computer readable media, stores instructions for execution by the processor 522. The system memory 523 is only one example of tangible, computer-readable media. In one aspect, the computing unit 506 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processors 522, 532, the machine becomes an apparatus for practicing the disclosed subject matter.

In addition, the processor 522 is in electrical communication with the force sensors 140. The processor 522 may also be in electrical communication with peripheral vehicle systems that are available throughout a vehicle to ensure proper mechanical operation or to create enhanced driving experiences. The peripheral vehicle systems gather and utilize a plurality of operational input signals received from environmental sensors positioned throughout the vehicle. In some implementations, the system 500 further includes a transceiver that is in electrical communication with the processor 522, one or more of the peripheral vehicle systems, and the environmental sensors installed throughout the vehicle. In other non-limiting implementations, the system 500 further includes at least one power amplifier 530 that is in electrical communication with the processor 522 and/or at least one respective haptic exciter 160. The amplifier 530 may be configured to dynamically adjust environmental data inputs received from the peripheral vehicle systems and directed to a haptic exciter 160, or the processor 522 may utilize the amplifier 530 for dynamic control of a system of haptic exciters 160. Dynamically controlling at least one haptic exciter 160 with a signal subject to varying degrees of amplification allows for the at least one haptic exciter 160 to provide a driver with feedback that is tailored for conditions that change over time. For example, and without limiting the invention, the processor 522 may instruct the amplifier 530 to adjust the magnitude of a series of actuator input signals or portions thereof. With the processor 522 controlling not only the switching and selection of at least one haptic exciter 160, the processor 522 may also instruct the system 500 to actuate at least one haptic exciter 160 to account for response times of the system 500, adjust the tactile responses according to environmental conditions about the vehicle, and provide a driver with sequences of haptic outputs and/or audio outputs having controlled combinations of magnitudes, positions on a steering wheel, and duration.

However, in other implementations, the system 500 includes two or more processors and/or memories, and the processors and/or memories may be disposed on the first and/or second PCBs. And, in other implementations, the assembly includes one or more PCBs on which one or more force sensors, one or more memories, and one or more processors are disposed.

Aspects of the present invention are described above with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 15:
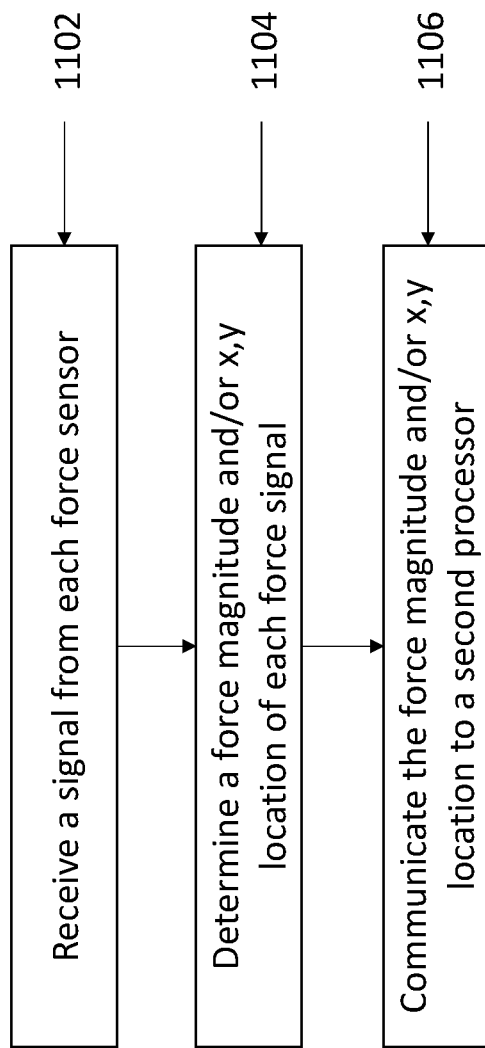
FIG. 15 illustrates a flow diagram of instructions stored on a memory for execution by a processor disposed on the second PCB, according to one implementation.

FIG. 15 illustrates a flow diagram of instructions stored in the first memory 523 for execution by the first processor 522 according to one implementation. The instructions cause the first processor 522 to: (1) receive a signal from each of the one or more force sensors 140, the signal being associated with a force received by each of the force sensors 140, as shown in step 1102, (2) determine a force magnitude and/or x,y location associated with the received force signals, as shown in step 1104, and (3) communicate the force magnitude and/or x,y location to the second processor 532 disposed on the first PCB 110, as shown in step 1106. Having the force sensors 140 in close proximity to the first processor that initially processes the signals from the force sensors 140 reduces the likelihood of noise in the signals.

Figure 16:
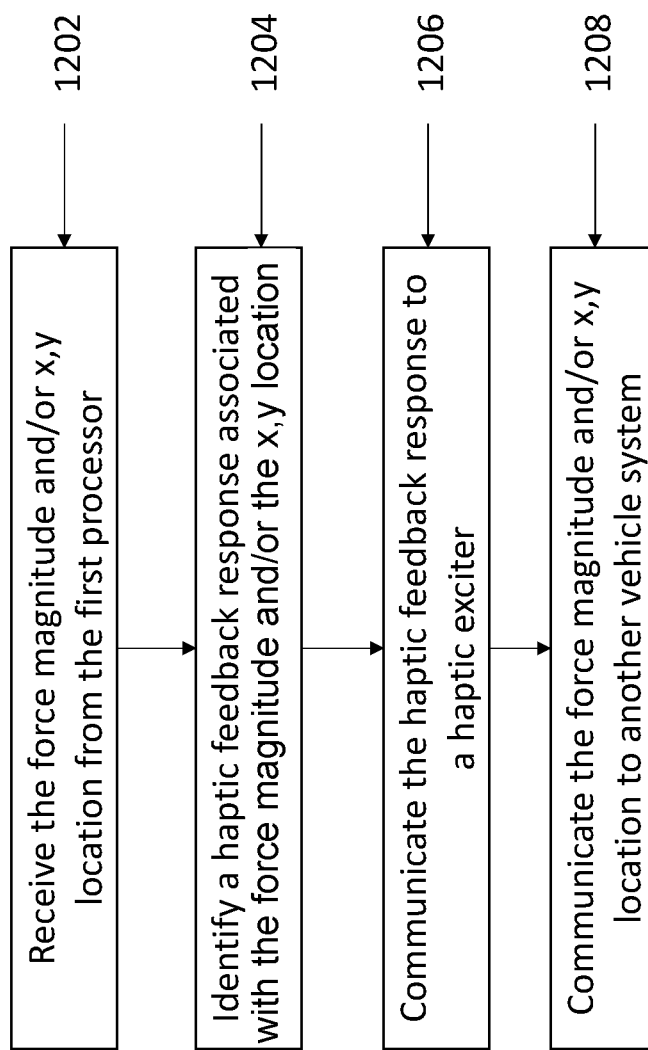
FIG. 16 illustrates a flow diagram of instructions stored on a memory for execution by a processor disposed on the first PCB, according to one implementation.

FIG. 16 illustrates a flow diagram of instructions stored in the second memory 533 for execution by the second processor 532. The instructions stored in the second memory 533 cause the second processor 532 to: (1) receive the force magnitude and/or x,y location from the first processor 522, as shown in step 1202, (2) identify a haptic feedback response associated with the force magnitude and or x,y location as shown in step 1204, (3) communicate the haptic feedback response to a haptic exciter 160, as shown in step 1206, and (4) communicate the x,y location and/or the force magnitude to another vehicle system, as shown in step 1208. The switch assembly 100 according to one implementation may be configured for controlling up to 32 functions.

Figure 17:
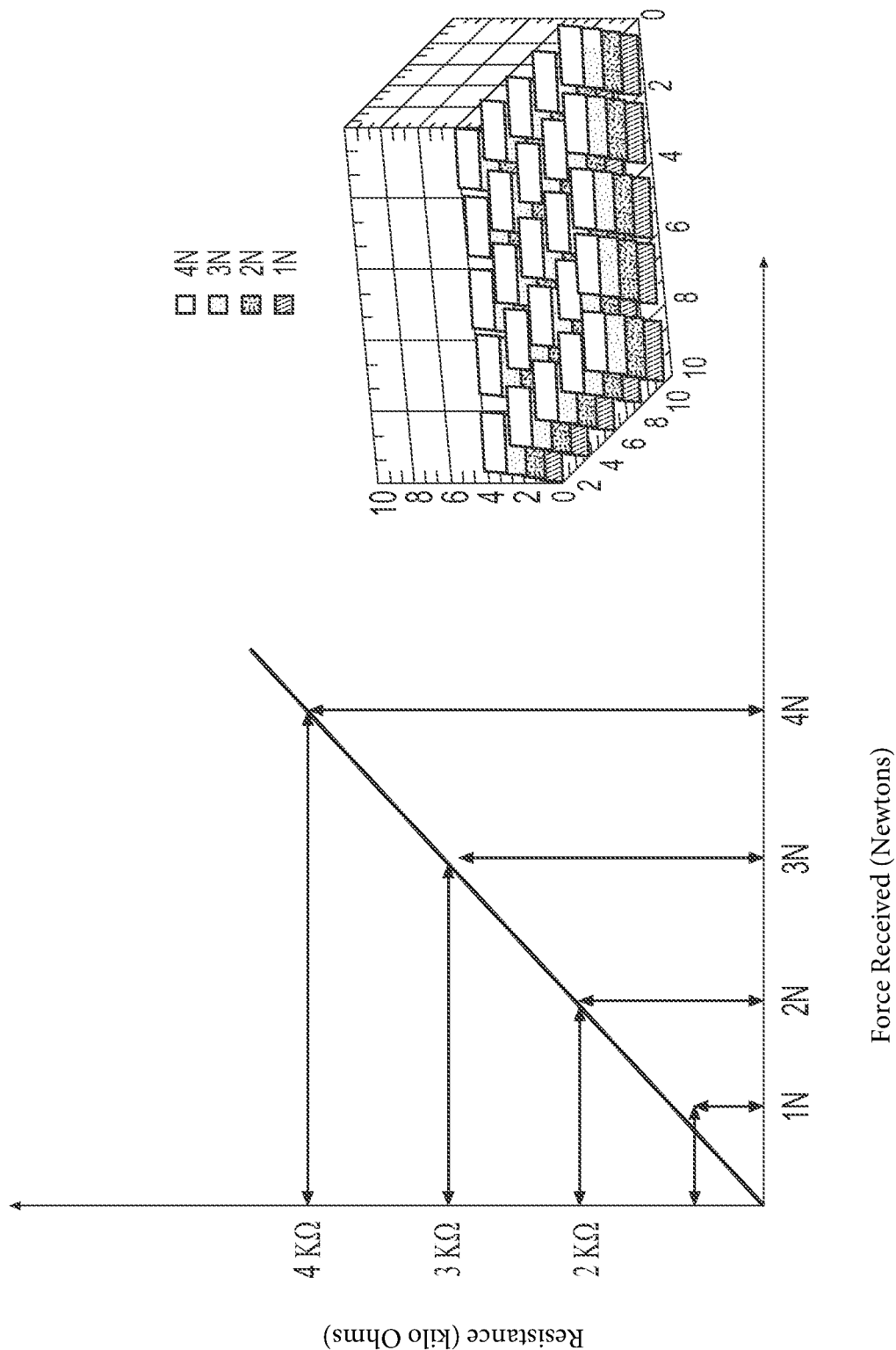
FIG. 17 illustrates a graph of a resistance sensed by the force sensors and a corresponding force signal associated with each resistance level, according to one implementation.
Figure 18A:
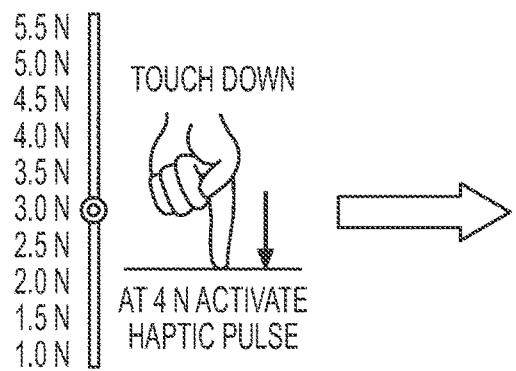
FIGS. 18A-18D illustrate example touch events and a corresponding haptic response to each touch event, according to one implementation.
Figure 18A:
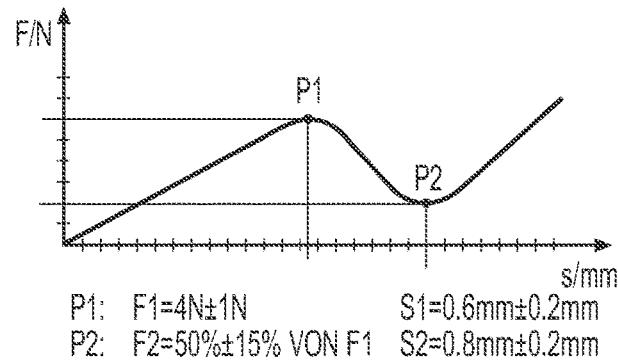
Figure 18B:
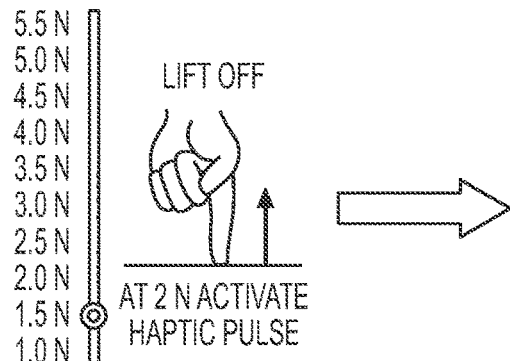
Figure 18B:
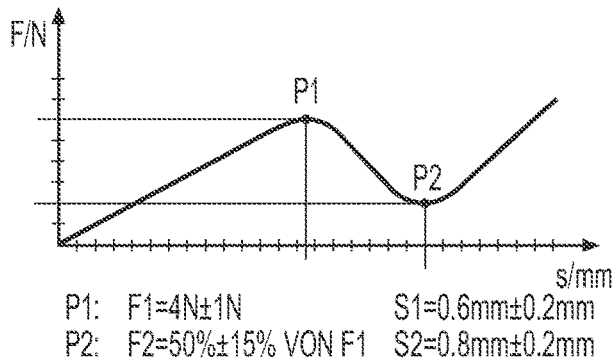
Figure 18C:
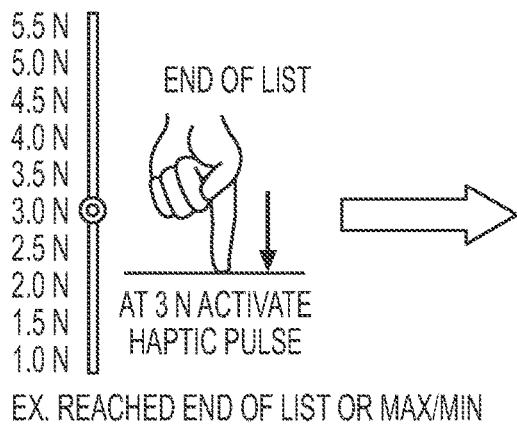
Figure 18C:
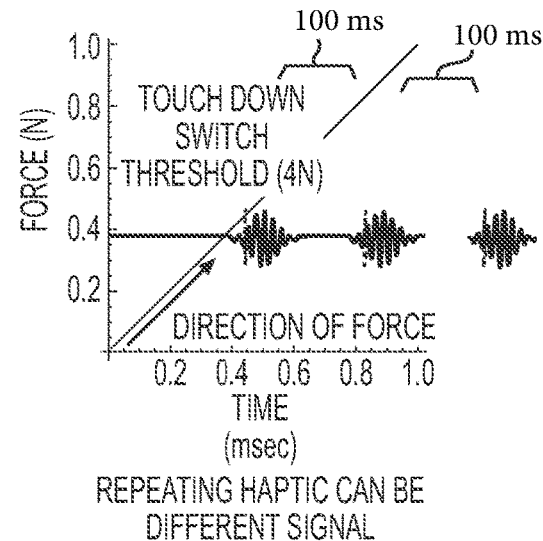
Figure 18D:
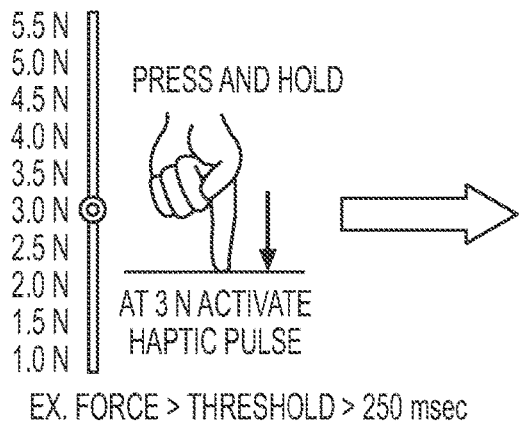
Figure 18D:
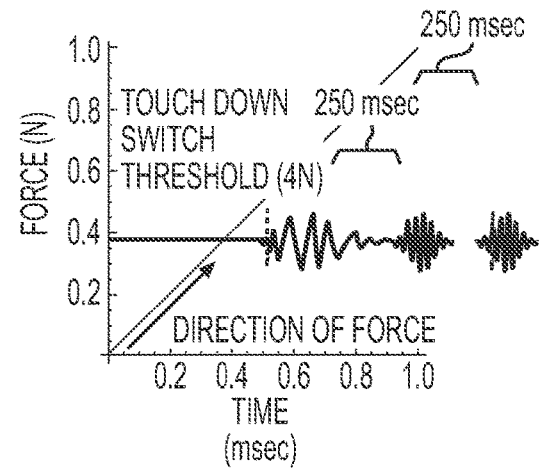

The force sensors 140 each receive a portion of the force applied to the touch overlay 195, and the force received by each sensor 140 is processed by the first processor 522 to determine a position and magnitude of the force applied. The position of the force is determined by the portion of the force received by each force sensor 140 and their known location relative to each other. For example, in the implementation shown in FIG. 17, the force received by each sensor 140 (shown on the x-axis) is associated with a resistance (shown on the y-axis). The position of the applied force is measured in either one dimension (e.g., the x- or y-dimension) or two dimensions (e.g., the x- and y-directions or plane), and the magnitude of the force is measured in the z-direction. In the implementation shown in FIGS. 1-12, which has four force sensors 140, the position of the force is determined by quad-angulation of the force signals received from each sensor 140. In further or alternative implementations, the position of the force is determined by tri-angulation using three force sensors. For example, if one of the four force sensors 140 fails during operation, the location is determined by tri-angulation using the force signal received from the remaining three sensors 140.

The switch assembly 100 also senses the time that a force is applied at a particular location. For example, the memory 523 may store processing parameters, such as a range of force over time values that indicate an input signal has been received. Input received outside of the range may be ignored by the system as unintentional contact with the switch assembly 100. For example, the upper limit of the input range may be 10N of force applied for 20 seconds or less. Furthermore, the switch assembly 100 may also set a force threshold for locking an input area (e.g., 2.5 N) around a location of force input and a second, higher threshold for a force received within the input area for enabling the system 100 (e.g., 3 N). Additional description of force thresholds and virtual input areas are provided in U.S. Patent Application Publication Nos. 2015/0097791 and 2015/0097795, both published Apr. 9, 2015, which are included in the Appendix to this application.

In response to the magnitude, location, and/or duration of the applied force meeting the input parameters, the switch assembly 100 generates a haptic and/or audible feedback signal responsive to the detected force. For example, the haptic and/or audible feedback signal may be proportional to the force received. As shown in FIGS. 18A-D, each touch event (e.g., touch-down shown in FIG. 18A, lift-off shown in FIG. 18B, end of list shown in FIG. 18C, and hold-down shown in FIG. 18D) is initiated by a different user interaction (e.g., different force value and/or duration of the touch) and, accordingly, can trigger different haptic and/or audible output feedbacks provided to the user. Example haptic and/or audible feedback signal responses are described in U.S. Patent Application Publication Nos. 2015/0097794 and 2015/0097793, both published Apr. 9, 2015, which are herein incorporated by reference in their entireties.

The drawings illustrate the switch assembly as viewed in an upright orientation in which the central longitudinal axis A-A is vertically oriented. However, the orientation shown in the drawings should not limit how the switch assembly may be oriented within the vehicle. For example, in various implementations, the switch assembly is disposed in the vehicle such that the central longitudinal axis A-A is horizontal or has a horizontal component relative to the ground.

In further implementations, the haptic exciter of the switch assembly 100 is used to provide haptic feedback to a user of the switch assembly 100 and to vibrate adjacent portions of the steering assembly or the entire steering assembly in response to receiving a communication from a vehicle communication system. For example, in one such implementation shown in FIG. 21, the memory 523 stores instructions for execution by the processor 522, and the instructions cause the processor to receive a force signal 2140 from the at least one force sensor 140 and identify whether a touch event occurred at the touch surface 197 of the touch plate 195, based on the force signal 2140. In response to identifying the touch event, the processor 522 communicates a first output signal 2110 to the haptic exciter (or actuator) 160, and the first output signal 2110 causes the haptic exciter 160 to propagate a first inaudible pressure wave 2161A having a frequency within a switch feedback frequency range. The first pressure wave 2161A causes a first tactilely-perceptible vibration on the touch surface 197 along the axis of propagation. The switch feedback frequency range includes those frequencies that assist in isolating the haptic response perceived by the user to the switch assembly 100 without causing a corresponding haptic response in an associated installation, such as the steering assembly or other portion of the vehicle to which the switch assembly 100 is coupled. For example, the switch feedback frequency range includes a series of frequencies below a resonant frequency of the steering assembly 50 that help to isolate the vibration from the first inaudible pressure wave 2161A to the touch surface 197. By triggering a first output signal 2110 from the processor to stimulate an inaudible pressure wave having frequency from the actuator, the switch assembly accommodates a haptic response that is substantially contained within the structure of the switch assembly 100.

And, in some implementations, in response to receiving a message 2108 from the vehicle communication system 2100, the instructions further cause the processor 522 to communicate a second output signal 2112 to the haptic exciter 160. The second output signal 2112 causes the haptic exciter 160 to propagate a second inaudible pressure wave 2161B that is close to or at the resonant frequency of the steering assembly 50. The second pressure wave 2161B causes a second tactilely-perceptible vibration of the steering assembly. For example, the frequency of the second inaudible pressure wave 2161B may be selected from a range of frequencies that includes the resonant frequency of the steering wheel. The minimum frequency in the range is the minimum frequency required to cause tactilely perceptible vibration of a rim portion of the steering assembly, and the maximum frequency is the maximum frequency that does not cause damaging vibrational movement to the steering assembly.

Example messages 2108 may include communications from a speedometer, accelerometer, suspension sensors, hand detection system, horn system, or any other vehicle system that may need to communicate a vehicle operation status, warning, or other information to a vehicle occupant. In addition, one example message may include a warning that the car is out of its lane, and the vibration caused by the second inaudible pressure wave 2161B simulates driving over rumble strips defined on roadways.

Figure 21:
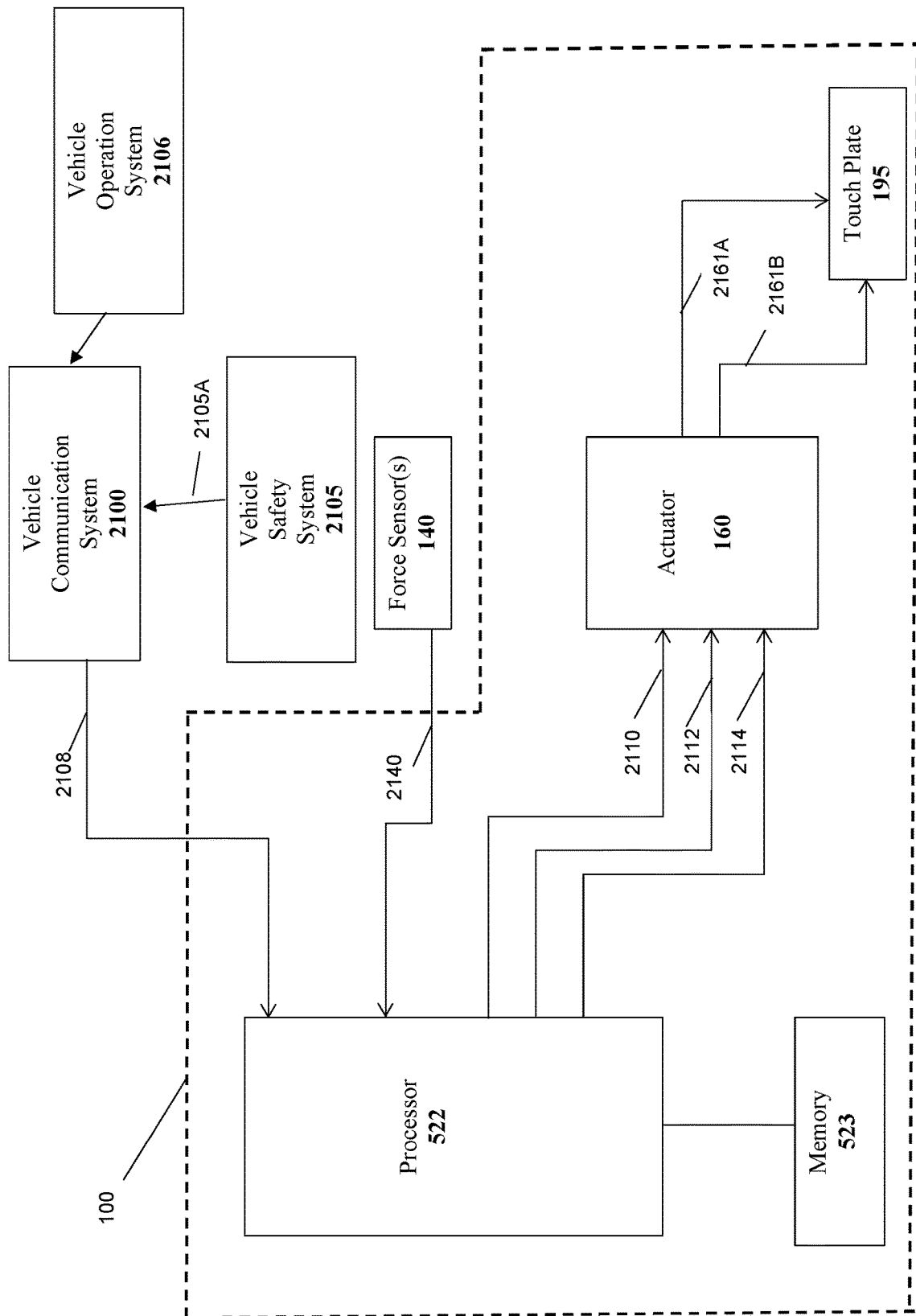
FIG. 21 is a schematic diagram of a vehicle communication system in communication with the switch assembly according to one implementation.

To coordinate data input and output from the switch assembly 100, the processor 522 is electrically coupled to the memory 523, the force sensors 140, the haptic exciter 160, and the vehicle communication system 2100. As shown in FIG. 21, the vehicle communication system 2100 is separate from the switch assembly 100. In addition, the vehicle communication system 2100 may be in electrical communication with a vehicle safety system 2105 and/or a vehicle operation system 2106 and can communicate messages from these systems 2105, 2106 to the processor 522. Alternatively, the vehicle safety system 2105 and/or the vehicle operation system 2106 may be electrically coupled to the processor 522 separately from the vehicle communication system 2100.

The haptic exciter 160 may include a speaker. For example, the speaker may include a standard voice coil assembly with the cone removed. The computerized instructions stored in the memory 523 further cause the processor 522 to select an audible pressure wave from one or more memory-stored audible pressure waves and communicate a third output signal 2114 to the speaker. The third output signal 2114 from the processor 522 causes the speaker to propagate the selected audible pressure wave.

In some implementations, the instructions stored in the memory 523 cause the processor to communicate to the speaker the output signal 2114 and the vibrational output signal 2112 in sequence. The audio output signal 2114 may be communicated before the vibrational output signal, or vice versa. Both the output signal 2114 and the vibrational output signal 2112 may be subject to instructions from the processor 522 and the amplifier 530, described above as initiating combinations and sequences of outputs of haptic and audio effects from at least one haptic exciter 160. The system 500 is, therefore, a dynamically tunable arrangement of haptic exciters 160 controlled by at least one processor 522 in conjunction with appropriate switching and amplification circuits. And, the processor 522 may delay the communication of each signal 2114, 2112 by a predetermined time period. For example, in one implementation, the delay may be 25 milliseconds or less. In other implementations, the delay can be selected based on the haptic effect desired for the user.

To increase efficiencies and to control the haptic sensations experienced by a user, some implementations of the switch assembly 100 incorporate computerized logic to account for ambient vibration. In such implementations, the memory 523 stores additional computerized instructions that cause the processor 522 to receive an ambient vibration signal associated with ambient vibration of the steering assembly, identify a pressure wave offset associated with the ambient vibration, and modify the second output signal 2112 based on the identified pressure wave offset. This modification to the second output signal 2112 changes at least one characteristic of the second pressure wave propagated from the haptic exciter 160. Example pressure wave offsets includes frequency offsets, amplitude offsets, and/or duration offsets. In addition, the frequency with which each discrete pressure wave is propagated may be modified based on the ambient vibration signal.

In some implementations, the ambient vibration relevant to the pressure wave offset may be determined using the force signals 2140 from the force sensors 140. The ambient vibration signal is determined by the processor 522 based on an average magnitude and frequency of each of the force signals 2140 generated by the force sensors 140. To avoid false readings and noise issues, the processor 522 determines whether an average magnitude of the force signals 2140 exceeds a threshold, and the processor 522 identifies the pressure wave offset in response to determining that the average magnitude exceeds that threshold. In other implementations, the ambient vibration signal may be determined using one or more signals received from an accelerometer that is coupled to the steering assembly and is in electrical communication with the processor 522.

In further or additional implementations, the processor 522 may identify a pressure wave offset associated with the vehicle speed, a warning message received from the vehicle safety system 2105, and/or an operation message received from the vehicle operation system 2106 and modify the second output signal 2112 based on the identified pressure wave offset. In addition, the frequency with which each discrete pressure wave is propagated may be modified based on the speed, warning message, and/or operation message.

Figure 22:
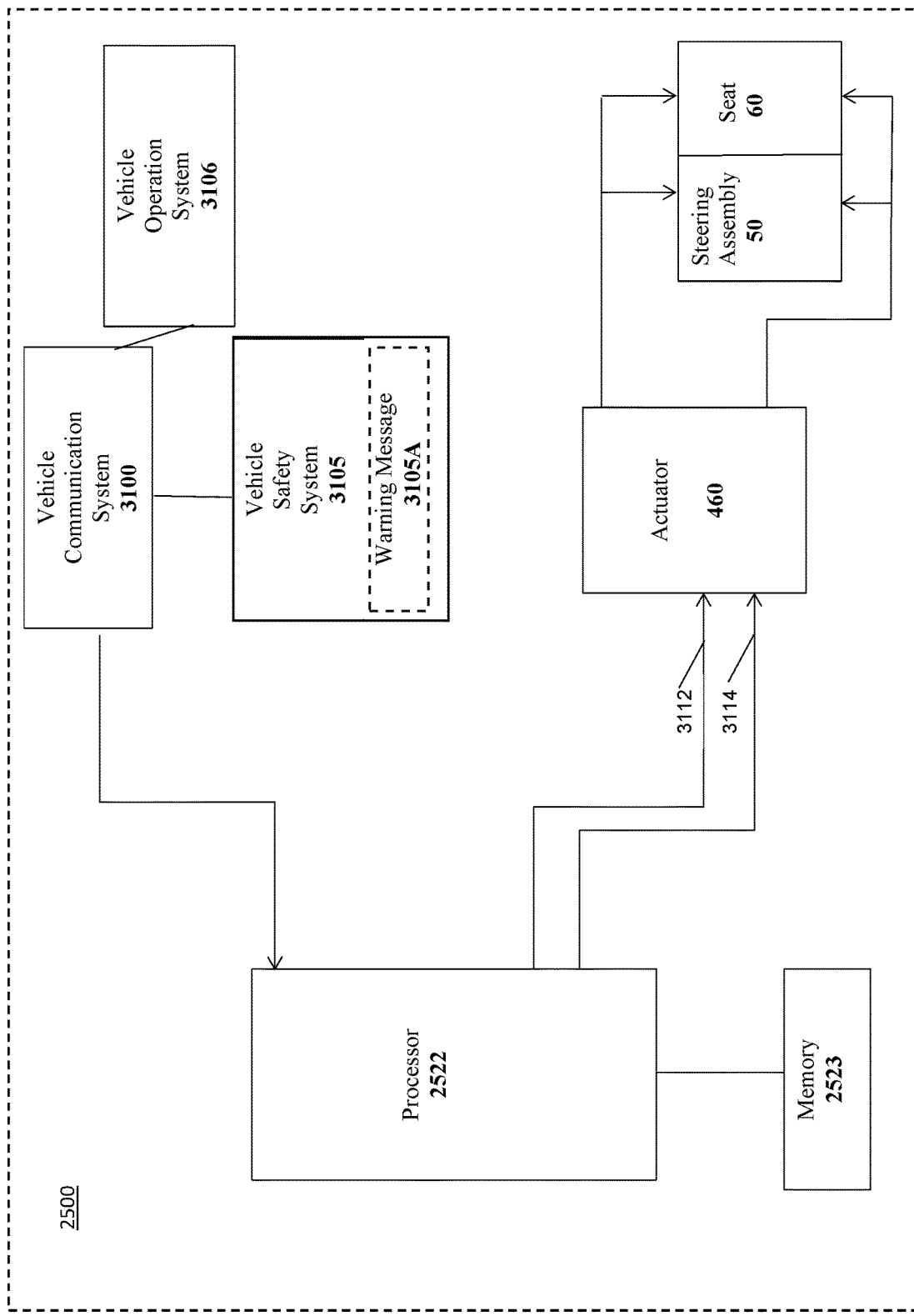
FIG. 22 is a schematic diagram of a haptic communication system in communication with a vehicle communication system according to one implementation.
Figure 23:
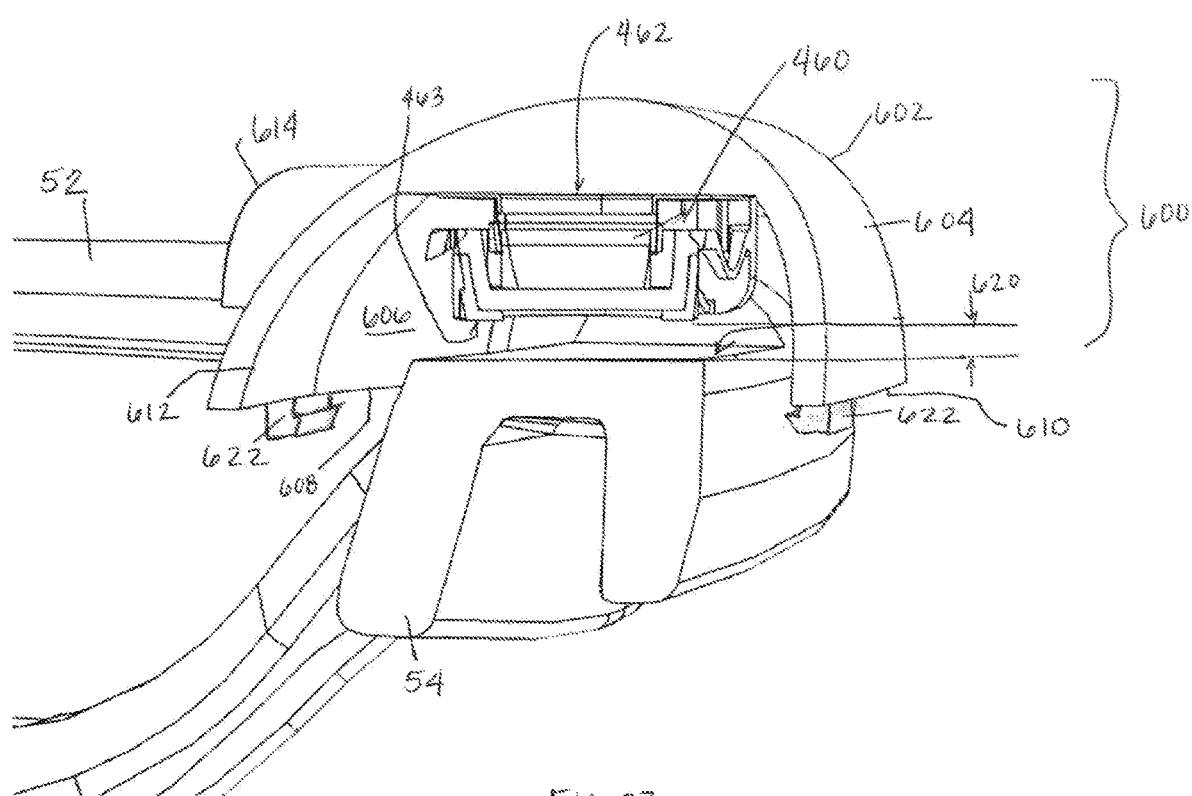
FIG. 23 is a cross-sectional view of an actuator assembly coupled to a rim portion of a steering wheel assembly, according to one implementation. The cross-sectional view is taken through a plane that bisects the actuator assembly and the rim portion.
Figure 25:
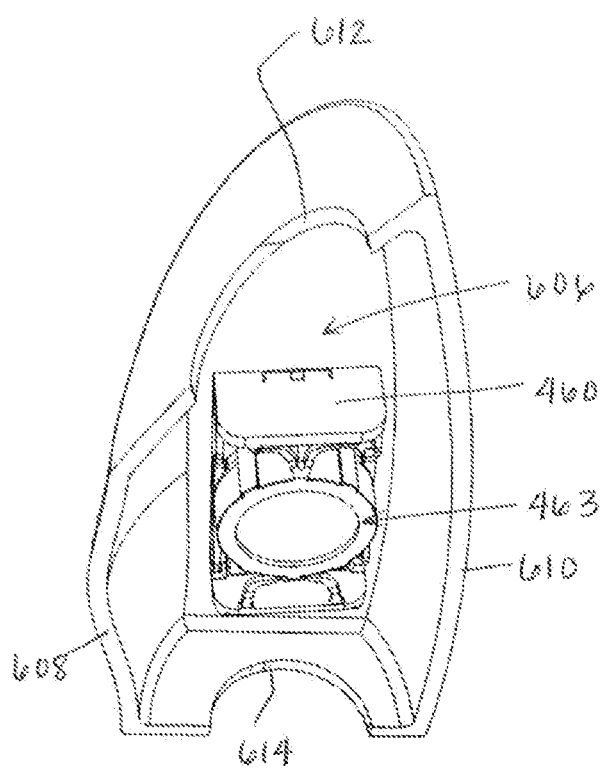
FIG. 25 is a perspective view of an interior surface of the housing and a lower surface of an actuator of the actuator assembly according to the implementation shown in FIG. 23.
Figure 24:
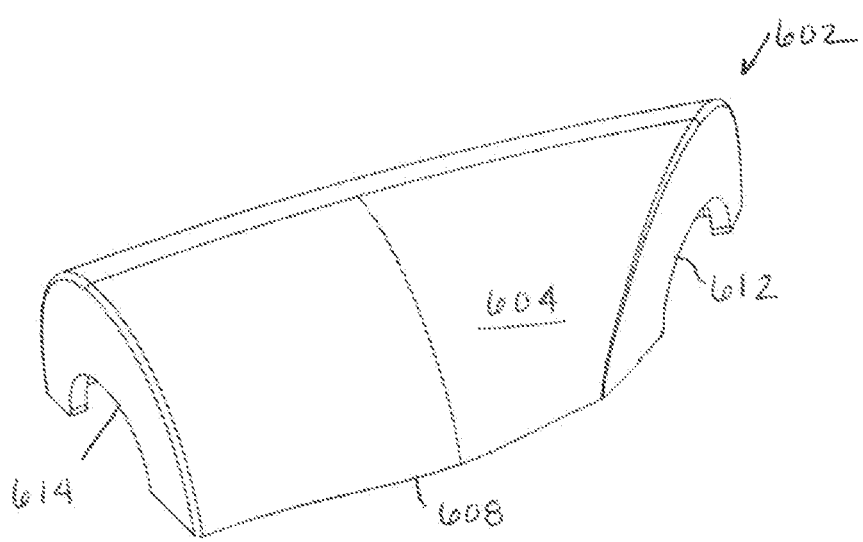
FIG. 24 is a perspective view of an exterior surface of a housing of the actuator assembly according to the implementation shown in FIG. 23.
Figure 27:
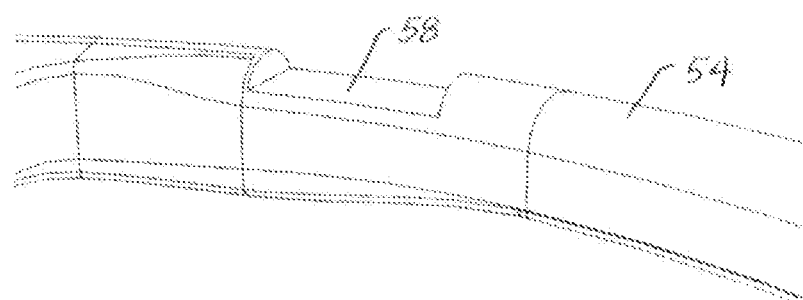
FIG. 27 is a perspective view of a recess defined in a frame of the rim portion of the steering wheel assembly, according to the implementation shown in FIG. 23.
Figure 28:
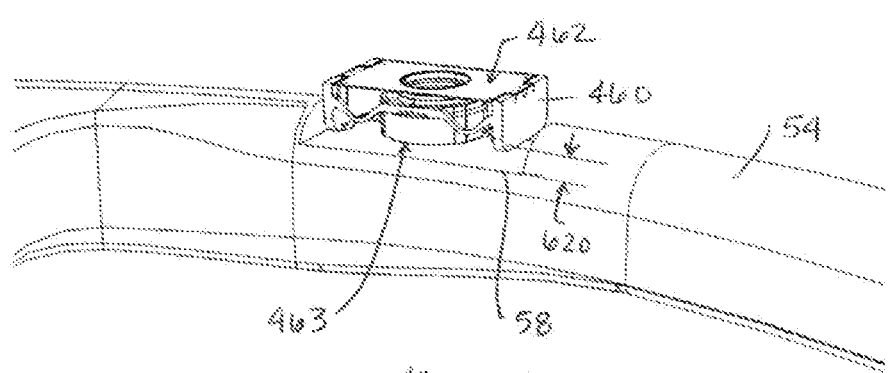
FIG. 28 is a perspective view of the actuator of the actuator assembly disposed spaced apart from and adjacent the recess shown in FIG. 27.
Figure 26:
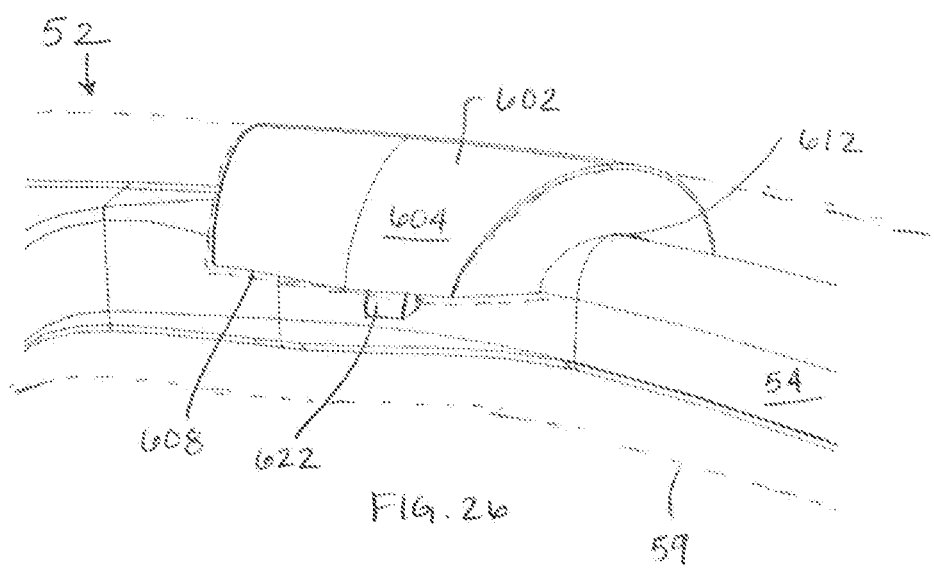
FIG. 26 a perspective view of an inner radial edge and exterior surface of the housing of the actuator assembly according to the implementation shown in FIG. 23.

In addition, in some implementations, two or more switch assemblies 100 may be used to provide haptic communication to the user. As described below in relation to FIG. 22, the haptic output of the switch assemblies 100 may be coordinated by one or more processors to provide an overall haptic response for the user, based on the message received by the one or more processors.

Although the ability to provide various levels of haptic outputs is described above in relation to the switch assembly 100 shown in FIGS. 1-20, other switch assemblies than the switch assembly 100 described above may be used to receive and provide haptic feedback for touch input and to vibrate at least a portion of the steering assembly. Example switch assemblies include a touch plate that includes a touch surface and an inner surface that is opposite and spaced apart from the touch surface, at least one force sensor disposed adjacent the inner surface of the touch plate and that receives a force applied to the touch surface, and an actuator having an output surface from which pressure waves are propagated along an axis of propagation. The output surface of the actuator is vibrationally coupled to the touch plate.

Other implementations include a haptic communication system 2500 that includes at least one actuator 460 coupled to a portion of the vehicle that is likely to be in physical contact with an occupant or that can transfer vibration to a portion of the vehicle likely to be in physical contact with the occupant. For example, the actuator 460 may be coupled to the steering assembly 50 separately from a switch assembly, such as switch assembly 100 or those described above, or within a seat 60. The actuator 460 has an output surface, and the output surface is coupled (either physically or vibrationally) to the steering assembly 50 or the seat 60. The system 2500 also includes a processor 2522 that is in electrical communication with the actuator 460, a memory 2523, and the vehicle communication system 3100, which is separate from the haptic communication system 2500. The vehicle communication system 3100 is in electrical communication with vehicle safety system 3105 and vehicle operation system 3106, and vehicle communication system 3100 communicates messages from systems 3105, 3106 to the processor 2522. In alternative implementations, systems 3105 and/or 3106 are electrically coupled directly with the processor 2522. The memory 2523 is similar to memory 523 described above, and the processor 2522 is similar to the processor 522 described above.

In example installations in which the actuator 460 is coupled (physically and/or vibrationally) to the steering assembly 50, the actuator 460 is spaced apart from the steering wheel frame. In some implementations, the output surface of the actuator 460 is physically and vibrationally coupled to a non-frame surface of the steering assembly 50, and the non-frame surface amplifies and propagates the inaudible and/or audible pressure wave output from the output surface of the actuator 460, similar to a cone of a standard voice coil assembly. The surface to which the output surface is coupled acts as the cone portion of a standard voice coil assembly.

For example, the actuator 460 may be disposed adjacent a spoke portion 62A, 62B of the steering wheel frame but is spaced apart from the frame. For example, the actuator 460 may be directly coupled to the outer trim of the spoke portion 62A, 62B. In some embodiments, the actuator 460 may be disposed between a frame of the hub portion and an outer trim of the hub portion. For example, the actuator 460 may be coupled to an inner surface of a cover of an air bag module that is coupled to the hub portion of the frame of the steering assembly 50, to an inner surface of a back cover of the hub of the steering assembly 50, or to an inner surface of the trim extending between the hub portion and the rim portion. In implementations in which the actuator 460 is coupled to the seat or other portion of the vehicle, the actuator 460 is spaced apart from the frame or other rigid structural portion of the seat or vehicle.

In some embodiments, the actuator 460 may be disposed between a rim portion of a frame and an outer trim of the rim portion. For example, the actuator 460 may be disposed between an overlay (e.g., overmolded foam over the frame) surrounding a frame of the rim portion and the outer trim (e.g., skin) of the rim portion. For example, FIGS. 23-29 illustrate an implementation of an actuator assembly 600 for coupling to the rim portion 52 of the steering wheel assembly 50. The actuator assembly 600 includes a housing 602 and an actuator 460. The housing 602 has an exterior surface 604, an interior surface 606, a radially inner edge 608, a radially outer edge 610, a first circumferential edge 612, and a second circumferential edge 614. The interior 606 and exterior surfaces 604 extend between the radially inner 608 and radially outer edges 610 and the first 612 and second circumferential edges 614. The radially inner edge 608 and the radially outer edge 610 are spaced apart from each other and follow the annular shape of the rim portion 52. The radially inner edge 608 is closer to a center of the steering wheel assembly 50 than the radially outer edge 610. The first circumferential edge 612 and the second circumferential edge 614 are spaced apart from each other, and the edges 612, 614 follow the shape of the outer surface of the rim portion 52 as viewed through a plane that bisects the housing and the rim portion 52. The exterior surface 604 is contoured to correspond with the contour of the outer surface of the rim portion 52 of the steering wheel assembly 50 adjacent the housing 602 prior to coupling the outer trim (e.g., skin) to the rim portion 52. For example, in an implementation in which the frame 54 of the rim portion 52 is overmolded with foam 59, which is shown by the dotted lines in FIG. 26, and the foam defines the contour of the outer surface of the rim portion 52 prior to coupling the outer trim to the rim portion 52, the exterior surface 604 of the housing 602 follows the contour of the outer surface of the foam such that the housing 602 is not (or is less) visually perceptible after the outer trim is coupled to the rim portion 52 and the housing 602.

The actuator 460 has an output surface 462 and a lower surface 463 opposite and spaced apart from the output surface 462. The output surface 462 is coupled to the interior surface 606 of the housing 602. For example, the output surface 462 may be coupled to the interior surface 606 using an adhesive (e.g., layer or pad), clips, screws, or other suitable fastening mechanism. Audible and/or inaudible pressure waves are output from the output surface 462 and are received and further propagated by the interior surface 606 of the housing 602.

The frame 54 of the rim portion 52 defines a recess 58 adjacent to where the actuator assembly 600 is to be coupled to the rim portion 52. The recess 58 may be overmolded with foam or not, according to various implementations. The depth of the recess 58 (with or without foam) is sufficiently deep such that the lower surface 463 of the actuator 460 is spaced apart from the frame (or foam) by a gap 620 when the housing is coupled to the rim portion 52. The gap 620 prevents interference with the operation of the actuator 460 by the surface below the lower surface 463 of the actuator 460. For example, in some implementations, the actuator includes a magnet that moves in a z-direction to cause the propagation of pressure waves from the output surface 462.

The actuator assembly 600 is coupled to the rim portion 52. For example, the housing 602 may be taped, adhered to, or clipped to the foam surface of the rim portion 52. In one implementation, the housing 602 includes tabs 622 that extend from the radially inner edge 608 and the radially outer edge 610. Each tab 622 has an engagement surface that extends and is biased radially inwardly. The engagement surface may be a protrusion, such as dimple or a ledge. The foam defines openings (not shown) into which the tabs 622 extend to prevent movement of the housing 602 relative to the rim portion 52 and to maintain the gap 620 between the lower surface 463 of the actuator 460 and the recess 58. In some implementations, a resilient material (e.g., rubber or elastomeric material) is disposed between the housing and the foam, and the resilient material may be selected to provide a range of mechanical responses, depending on the input received (i.e., the resilient material may either attenuate or amplify the sensation to the operator of the vibration from the pressure waves output by the actuator 460).

According to some implementations, the housing 602 is a stiff material, such as plastic, glass filled nylon, thin metal.

Figure 29:
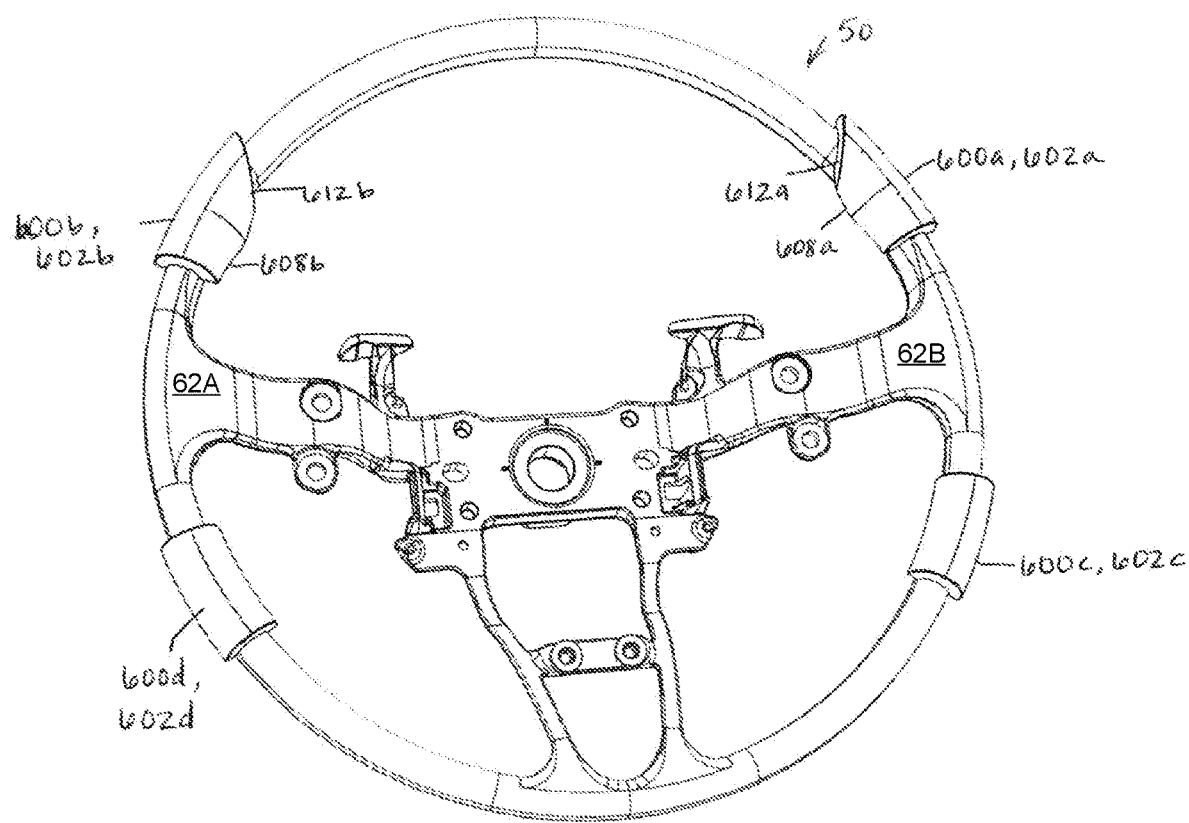
FIG. 29 is a perspective front view of a steering assembly having four actuator assemblies coupled thereto, according to one implementation.

FIG. 29 illustrates one implementation in which four actuator assemblies 600*a*, 600*b*, 600*c*, 600*d* are coupled to the rim portion 52 at four circumferentially spaced apart locations along the rim portion 52. Actuator assemblies 600*a* and 600*b* are coupled to the rim portion 52 above the spoke portion 62A, 62B at 2 and 10 o'clock, respectively, and actuator assemblies 600*c* and 600*d* are coupled to the rim portion 52 below the spoke portion 62A, 62B at 4 and 8 o'clock, respectively. The first circumferential edge 612*a* of housing 602*a* tapers from the outer radial edge 610*a* to the inner radial edge 608*a*, and the first circumferential edge 612*b* of housing 602*b* tapers from the outer radial edge 610*b* to the inner radial edge 608*b*. These tapered edges correspond to an area where an operator's thumbs are expected to rest on the rim portion 52.

In some implementations, the actuator 460 is a speaker. For example, the speaker may include a standard voice coil assembly with the cone removed (i.e., a coneless voice coil). The system described herein may utilize a plurality of coneless voice coils connected as at least a first speaker and a second speaker. In some implementations, the respective speaker is a low frequency/high octave speaker. In this regard, a low frequency tactile signal for actuating a haptic exciter (160) may be multiplexed or otherwise combined with a higher frequency audio input to provide additional degrees of information simultaneously. The higher waveform could be transposed either in front of the low frequency tactile waveform, or, after the low frequency tactile waveform, or, in other embodiments on top of the low frequency tactile waveform used as a carrier signal.

The haptic communication system 2500 described above refers to one actuator 460, but in various implementations, one or more actuators 460 may be used. For example, in some implementations, the actuators 460 are spaced apart from each other within an installation. For example, when coupled to steering assembly 50, the actuators 460 may be disposed adjacent the left spoke and the right spoke of the steering assembly 50 or disposed on a left and a right side of the hub portion (e.g., adjacent an inner surface of a cover for an air bag module or adjacent a back cover of the hub of the steering assembly 50). The processor 2522 is in electrical communication with the actuators 460.

The instructions stored in the memory 2523 cause the processor 2522 to receive a message from the vehicle communication system 3100, identify a vibrational output signal 3112 associated with the message, and communicate the vibrational output signal 3112 to the actuator 460. The vibrational output signal 3112 causes the actuator 460 to propagate an inaudible pressure wave from the output surface of the actuator 460 against a surface of the seat 60 or steering assembly 50 in the vehicle, and the pressure wave causes tactilely-perceptible vibration of the seat 60 or steering assembly 50, respectively.

In a further or alternative implementation, the instructions cause the system processor 2522 to identify an audio output signal 3114 associated with the message. The processor 2522 communicates the audio output signal 3114 to the actuator 460, and the audio output signal 3114 causes the actuator 460 to propagate an audible pressure wave. For example, the audio output signal 3114 may be selected from one or more stored audio output signals. The stored audio output signals are accessible to the processor 2522 for communicating the identified audio output signal 3114 to the actuator 460 such that the audio output signal 3114 causes the actuator 460 to propagate an audible pressure wave from the output surface of the actuator 460. For example, the message is a warning message 3105A received from a vehicle safety system 3105, and the audio output signal 3114 is identified from a plurality of audio output signals associated with that warning message.

As another example, the message received by the processor 2522 may include an audio signal, and the audio output signal 3114 identified and communicated to the actuator 460 is the audio signal received by the processor 2522. For example, the audio signal from a cellular telephone call being routed through the vehicle communication system 3100 via a local area network (e.g., a Bluetooth network) may be output through the actuator 460.

In implementations in which the instructions cause the processor 2522 to output vibrational 3112 and audio output signals 3114 sequentially from the actuator 460 based on the message received, the audio output signal 3114 may be communicated before the vibrational output signal 3112, or vice versa. And, the processor 2522 may delay the communication of each signal 3112, 3114 by a predetermined time period. For example, in one implementation, the delay may be 25 milliseconds or less. In other implementations, the delay can be selected based on the haptic effect desired for the user.

In certain implementations, two or more actuators 460 are disposed on the steering assembly 50 or in the seat 60 and are spaced apart from each other. The processor 2522 is in electrical communication with the actuators 460. Instructions stored on the memory 2523 cause the processor 2522 to identify a first audio output signal associated with the message received by the processor 2522 from another system (e.g., the vehicle communication system 3100, the vehicle safety system 3105, and/or the vehicle operation system 3106), and communicate the first audio output signal to the first actuator 460. The first audio output signal causes the first actuator 460 to propagate a first audible pressure wave. The instructions also cause the processor to identify a second audio output signal associated with the message received by the processor 2522 from the other system and communicate the second audio output signal to the second actuator 460. The second audio output signal causes the second actuator 460 to propagate a second audible pressure wave. The first audible pressure wave and the second audible pressure wave may provide a stereo sound effect, or the first and second audio output signals may be communicated sequentially and with a time delay. For example, the audio output signals may be communicated in a particular pattern.

In a further or additional implementation, the instructions cause the processor 2522 to identify a first vibrational output signal and a second vibrational output signal associated with the received message and communicate the first vibrational output signal to the first actuator 460 and the second vibrational message to the second actuator 460. The first and second vibrational output signals cause the first and second actuators 460, respectively, to propagate inaudible pressure waves at or near the resonant frequency of the steering assembly 50. Similar to the effect described above in regard to the switch assembly 100, the inaudible pressure waves cause tactilely-perceptible vibration of the steering assembly 50.

According to various implementations, the first and second audio output signals may be output simultaneously or sequentially. In addition, the first and second vibrational output signals may be output simultaneously or sequentially. Furthermore, the first audio signal, the second audio signal, the first vibrational signal, and the second vibrational signal may be output sequentially in any order. Additionally, the above described amplifier 530 may be controlled by the processor to either attenuate or amplify audio and haptic outputs from a series of speakers. For example, the instructions from the processor 2522 direct the communication of the first and second vibrational output signals sequentially, such that the first vibrational output signal is communicated prior to the second vibrational output signal, or vice versa. Similarly, the programmed instructions may cause the processor 2522 to output the communication of the first and second audio output signals sequentially, such that the first audio output signal is communicated prior to the second audio output signal, or vice versa. In implementations in which the output includes audio and vibrational output, the audio output may be communicated prior to the vibrational output, or vice versa. And, the processor 2522 may delay the communication of one or both audio signals or one or both vibrational signals by a predetermined time period. For example, in one implementation, the delay may be 25 milliseconds or less. In other implementations, the delay can be selected based on the haptic effect desired for the user. The time delay may be associated with the message received by the processor from the other system.

In some implementations, the switch assembly 100 and the haptic communication system 2500 are configured to receive input data from other systems via wired and wireless electronic communications. For example, the switch assembly 100 and the haptic communication system 2500 include respective sets of computerized instructions accessible by respective processors, and these instructions facilitate data flow between haptic systems and other systems across a communication network.

In addition, in various implementations, the identification of audio and/or vibrational output signals to communicate, the order in which they are communicated, and/or the delay between propagation of discrete pressure waves by the actuator can define a haptic pattern. The haptic pattern may be selected from a plurality of stored haptic patterns based on the message received by the processor, such as processors 522, 2522.

The drawings illustrate the switch assembly as viewed in an upright orientation in which the central longitudinal axis A-A is vertically oriented. However, the orientation shown in the drawings should not limit how the switch assembly may be oriented within the vehicle. For example, in various implementations, the switch assembly is disposed in the vehicle such that the central longitudinal axis A-A is horizontal or has a horizontal component relative to the ground.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

The invention claimed is:

1. A haptic communication system comprising:
an actuator having an output surface, the output surface being coupled to a seat or a steering assembly of a vehicle; and
a processor in electrical communication with the actuator, a memory, and a vehicle communication system that is separate from the haptic communication system, the memory storing instructions for execution by the processor, wherein the instructions cause the processor to:
receive a message from the vehicle communication system;
identify a vibrational output signal associated with the message; and
communicate the vibrational output signal to the actuator, the vibrational output signal causing the actuator to propagate an inaudible pressure wave from the output surface against a surface of the seat or steering assembly, respectively, and
the pressure wave causing tactilely-perceptible vibration of the seat or steering assembly, respectively;
wherein the actuator is a first actuator and the haptic communication system comprises a second actuator coupled to the seat or steering assembly, the second actuator being spaced apart from the first actuator; and
wherein the processor is in electrical communication with the second actuator, the vibrational output signal is a first vibrational output signal, and the instructions further cause the processor to identify a second vibrational output signal associated with the message and communicate the second vibrational output signal to the second actuator, the second vibrational output signal causing the actuator to propagate a second inaudible pressure wave from a respective output surface of the second actuator against a different surface of the seat or steering assembly, respectively, to which the second actuator is coupled, the second inaudible pressure wave causing additional tactilely-perceptible vibration of the seat or steering assembly, respectively.

2. The haptic communication system of claim 1, wherein the first actuator is disposed between a rim portion of a frame and an outer trim of the steering assembly.

3. The haptic communication system of claim 1, wherein the first actuator is coupled to an inner surface of an outer cover of steering wheel assembly.

4. The haptic communication system of claim 1, wherein the first actuator is a speaker, and the instructions further cause the processor to identify an audio output signal from one or more stored audio output signals and communicate the audio output signal to the speaker, the audio output signal causing the speaker to propagate an audible pressure wave from the output surface of the speaker.

5. The haptic communication system of claim 4, wherein the instructions further cause the processor to communicate the audio output signal and the vibrational output signal in sequence.

6. The haptic communication system of claim 1 wherein the communication of the first and second vibrational output signals is sequential.

7. A haptic communication system comprising:
a coneless voice coil coupled to a steering assembly; and
a processor in electrical communication with the coneless voice coil, a memory, and a vehicle communication system that is separate from the haptic communication system, the memory storing instructions for execution by the processor, wherein the instructions cause the processor to:
receive a message from the vehicle communication system;
in response to receiving the message, identify an audio output signal associated with the message; and
communicate the audio output signal to the coneless voice coil, the audio output signal causing the coneless voice coil to propagate an audible pressure wave;
wherein the instructions further cause the processor to identify a vibrational output signal associated with the message and communicate the vibrational output signal to the coneless voice coil, the vibrational output signal causing the coneless voice coil, to propagate an inaudible pressure wave that is close to or at the resonant frequency of the steering assembly, the inaudible pressure wave causing tactilely-perceptible vibration of the steering assembly.

8. The haptic communication system of claim 7, wherein the coneless voice coil is disposed within a switch assembly, the switch assembly being coupled to the steering assembly.

9. The haptic communication system of claim 7, wherein the coneless voice coil is coupled to the steering assembly between a spoke portion of a frame and an outer trim of the steering assembly and is spaced apart from the frame.

10. The haptic communication system of claim 7, wherein the coneless voice coil is coupled to an inner surface of a cover of an air bag module, the air bag module being coupled to a hub portion of a frame of the steering assembly.

11. The haptic communication system of claim 7, wherein the coneless voice coil is coupled to a back cover of a hub of the steering assembly.

12. A switch assembly coupled to a steering assembly, the steering assembly having a resonant frequency, comprising:
a touch plate having a touch surface and an inner surface, the inner surface being opposite and spaced apart from the touch surface;
at least one force sensor disposed adjacent the inner surface of the touch plate, the at least one force sensor for receiving a force applied to the touch surface;
an actuator having an output surface from which pressure waves are propagated along an axis of propagation (A-A), the output surface of the actuator being vibrationally coupled to the inner surface of the touch plate;
a processor electrically coupled to a memory, the at least one force sensor, the actuator, and a vehicle communication system, the vehicle communication system being separate from the switch assembly, the memory storing instructions for execution by the processor, wherein the instructions cause the processor to:
receive a force signal from the at least one force sensor,
identify whether a touch event occurred based on the force signal,
in response to identifying the touch event, communicate a first output signal to the actuator, the first output signal causing the actuator to propagate a first inaudible pressure wave having a frequency ($f_I$) within a switch feedback frequency range, the switch feedback frequency range being below the resonant frequency ($f_R$) of the steering assembly, the first pressure wave causing a first tactilely-perceptible vibration of the touch plate along the axis of propagation (A-A), wherein the vibration caused by the first pressure wave of the first output signal is isolated to the switch assembly.

13. The switch assembly of claim 12, wherein the instructions further cause the processor to:
    receive an ambient vibration signal associated with ambient vibration of the steering assembly;
    identify a pressure wave offset ($\Delta V$) associated with the ambient vibration; and
    modify the second output signal based on the identified pressure wave offset ($\Delta V$) to change a characteristic of the second pressure wave.

14. The switch assembly of claim 13, wherein the at least one force sensor comprises a plurality of force sensors, and the ambient vibration signal is determined by the processor based on an average magnitude and frequency of each of the force signals generated by the force sensors.

15. The switch assembly of claim 14, wherein the instructions further cause the processor to determine whether the average magnitude exceeds a threshold, and the processor identifies the pressure wave offset in response to determining that the average magnitude exceeds the threshold.

16. The switch assembly of claim 15, wherein the instructions further cause the processor to:
    receive a vehicle speed;
    identify a pressure wave offset ($\Delta V$) associated with the vehicle speed;
    modify the second output signal based on the identified pressure wave offset ($\Delta V$) to change a characteristic of the second inaudible pressure wave.

17. The switch assembly of claim 13, wherein the pressure wave offset comprises a frequency offset, an amplitude offset, and/or a duration offset.

* * * * *